United States Patent
Kedem et al.

(10) Patent No.: US 10,430,224 B2
(45) Date of Patent: *Oct. 1, 2019

(54) METHODS AND APPARATUS FOR PROVIDING HYPERVISOR LEVEL DATA SERVICES FOR SERVER VIRTUALIZATION

(71) Applicant: Zerto Ltd., Herzilya (IL)

(72) Inventors: Ziv Kedem, Tel Aviv (IL); Chen Yehezkel Burshan, Tel Aviv (IL); Yair Kuszpet, Netanya (IL); Gil Levonai, Tel Aviv (IL)

(73) Assignee: Zerto Ltd., Herzilya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,568

(22) Filed: Oct. 10, 2016

(65) Prior Publication Data

US 2017/0024241 A1 Jan. 26, 2017

Related U.S. Application Data

(63) Continuation of application No. 14/687,341, filed on Apr. 15, 2015, now Pat. No. 9,489,272, which is a
(Continued)

(51) Int. Cl.
*G06F 9/455* (2018.01)
*G06F 3/06* (2006.01)
(Continued)

(52) U.S. Cl.
CPC .......... *G06F 9/45558* (2013.01); *G06F 3/067* (2013.01); *G06F 3/0653* (2013.01);
(Continued)

(58) Field of Classification Search
CPC ............. G06F 9/45558; G06F 2201/84; G06F 11/1471

See application file for complete search history.

(56) References Cited

U.S. PATENT DOCUMENTS

| 5,212,784 A | 5/1993 | Sparks |
| 5,544,347 A | 8/1996 | Yanai et al. |

(Continued)

FOREIGN PATENT DOCUMENTS

WO WO-2009/151445 12/2009

OTHER PUBLICATIONS

Appellant Zerto, Inc.'s Motion for Extension of Time to File its Initial Brief in the United States District Court for the District of Delaware in Case No. 1:12-cv-00956-GMS, dated May 4, 2016.
(Continued)

*Primary Examiner* — Farley Abad
(74) *Attorney, Agent, or Firm* — Foley & Lardner LLP; James De Vellis

(57) ABSTRACT

A cross-host multi-hypervisor system, including a plurality of host sites, each site including at least one hypervisor, each of which includes at least one virtual server, at least one virtual disk read from and written to by the at least one virtual server, a tapping driver in communication with the at least one virtual server, which intercepts write requests made by any one of the at least one virtual server to any one of the at least one virtual disk, and a virtual data services appliance, in communication with the tapping driver, which receives the intercepted write requests from the tapping driver, and which provides data services based thereon, and a data services manager for coordinating the virtual data services appliances at the site, and a network for communicatively coupling the plurality of sites, wherein the data services managers coordinate data transfer across the plurality of sites via the network.

20 Claims, 7 Drawing Sheets

Related U.S. Application Data continuation of application No. 13/175,892, filed on Jul. 4, 2011, which is a continuation-in-part of application No. 13/039,446, filed on Mar. 3, 2011.

(60) Provisional application No. 61/314,589, filed on Mar. 17, 2010.

(51) Int. Cl.
  *G06F 11/14* (2006.01)
  *G06F 11/20* (2006.01)

(52) U.S. Cl.
  CPC ........ *G06F 3/0665* (2013.01); *G06F 11/1451* (2013.01); *G06F 11/1471* (2013.01); *G06F 11/1484* (2013.01); *G06F 11/2069* (2013.01); *G06F 2009/4557* (2013.01); *G06F 2009/45579* (2013.01); *G06F 2201/815* (2013.01); *G06F 2201/84* (2013.01)

(56) References Cited

U.S. PATENT DOCUMENTS

| | | | |
|---|---|---|---|
| 5,649,152 | A | 7/1997 | Ohran et al. |
| 5,664,186 | A | 9/1997 | Bennett et al. |
| 5,835,953 | A | 11/1998 | Ohran |
| 5,933,653 | A | 8/1999 | Ofek |
| 5,935,260 | A | 8/1999 | Ofer |
| 5,991,813 | A | 11/1999 | Zarrow |
| 6,073,209 | A | 6/2000 | Bergsten |
| 6,073,222 | A | 6/2000 | Ohran |
| 6,658,591 | B1 | 12/2003 | Arndt |
| 6,910,160 | B2 | 6/2005 | Bajoria et al. |
| 6,944,847 | B2 | 9/2005 | Desai et al. |
| 7,063,395 | B2 | 6/2006 | Gagne et al. |
| 7,143,307 | B1 | 11/2006 | Witte et al. |
| 7,325,159 | B2 | 1/2008 | Stager et al. |
| 7,421,617 | B2 | 9/2008 | Anderson et al. |
| 7,464,126 | B2 | 12/2008 | Chen |
| 7,475,207 | B2 | 1/2009 | Bromling et al. |
| 7,516,287 | B2 | 4/2009 | Ahal et al. |
| 7,523,277 | B1 | 4/2009 | Kekre et al. |
| 7,557,867 | B2 | 7/2009 | Goo |
| 7,577,817 | B2 | 8/2009 | Karpoff et al. |
| 7,577,867 | B2 | 8/2009 | Lewin et al. |
| 7,603,395 | B1 | 10/2009 | Bingham et al. |
| 7,647,460 | B1 | 1/2010 | Wilson et al. |
| 7,720,817 | B2 | 5/2010 | Stager et al. |
| 7,765,433 | B1 | 7/2010 | Krishnamurthy |
| 7,791,091 | B2 | 9/2010 | Nagai |
| 7,849,361 | B2 | 12/2010 | Ahal et al. |
| 7,865,893 | B1 | 1/2011 | Omelyanchuk et al. |
| 7,971,091 | B1 | 6/2011 | Bingham et al. |
| 8,020,037 | B1 | 9/2011 | Schwartz et al. |
| 8,156,301 | B1 | 4/2012 | Khandelwal et al. |
| 8,352,941 | B1 | 1/2013 | Protopopov et al. |
| 8,650,299 | B1 | 2/2014 | Huang et al. |
| 2003/0149910 | A1 | 8/2003 | Qin et al. |
| 2004/0068561 | A1 | 4/2004 | Yamamoto et al. |
| 2004/0153639 | A1 | 8/2004 | Cherian et al. |
| 2005/0071588 | A1 | 3/2005 | Spear et al. |
| 2005/0171979 | A1 | 8/2005 | Stager et al. |
| 2005/0182953 | A1 | 8/2005 | Stager et al. |
| 2005/0188256 | A1 | 8/2005 | Stager et al. |
| 2006/0047996 | A1 | 3/2006 | Anderson et al. |
| 2006/0048002 | A1 | 3/2006 | Kodi et al. |
| 2006/0112222 | A1 | 5/2006 | Barrall |
| 2006/0129562 | A1 | 6/2006 | Pulamarasetti et al. |
| 2006/0161394 | A1 | 7/2006 | Dulberg et al. |
| 2007/0028244 | A1 | 2/2007 | Landis et al. |
| 2007/0112772 | A1 | 5/2007 | Morgan et al. |
| 2007/0162513 | A1 | 7/2007 | Lewin et al. |
| 2007/0220311 | A1 | 9/2007 | Lewin et al. |
| 2008/0086726 | A1 | 4/2008 | Griffith et al. |
| 2008/0177963 | A1 | 7/2008 | Rogers |
| 2008/0195624 | A1 | 8/2008 | Ponnappan et al. |
| 2008/0208555 | A1 | 8/2008 | Tatsuoka et al. |
| 2009/0150510 | A1 | 6/2009 | Kovacs et al. |
| 2009/0187776 | A1 | 7/2009 | Baba et al. |
| 2009/0249330 | A1 | 10/2009 | Abercrombie et al. |
| 2009/0283851 | A1 | 11/2009 | Chen |
| 2009/0307396 | A1 | 12/2009 | Nogueras et al. |
| 2010/0017801 | A1 | 1/2010 | Kundapur |
| 2010/0027552 | A1 | 2/2010 | Hill |
| 2010/0058335 | A1 | 3/2010 | Weber |
| 2010/0150341 | A1 | 6/2010 | Dodgson et al. |
| 2010/0175064 | A1 | 7/2010 | Brahmaroutu |
| 2010/0198972 | A1 | 8/2010 | Umbehocker |
| 2010/0250824 | A1 | 9/2010 | Belay |
| 2010/0250892 | A1 | 9/2010 | Logan et al. |
| 2010/0274886 | A1 | 10/2010 | Nahum et al. |
| 2011/0022812 | A1 | 1/2011 | Van Der Linden et al. |
| 2011/0055471 | A1 | 3/2011 | Thatcher et al. |
| 2011/0075674 | A1 | 3/2011 | Li et al. |
| 2011/0087874 | A1 | 4/2011 | Timashev et al. |
| 2011/0099200 | A1 | 4/2011 | Blount et al. |
| 2011/0099342 | A1 | 4/2011 | Ozdemir |
| 2011/0107331 | A1 | 5/2011 | Evans et al. |
| 2011/0125980 | A1 | 5/2011 | Brunet et al. |
| 2011/0131183 | A1 | 6/2011 | Chandhok et al. |
| 2011/0153569 | A1 | 6/2011 | Fachan et al. |
| 2011/0161299 | A1 | 6/2011 | Prahlad et al. |
| 2011/0161301 | A1 | 6/2011 | Pratt et al. |
| 2011/0179341 | A1 | 7/2011 | Falls et al. |
| 2011/0202734 | A1 | 8/2011 | Dhakras et al. |
| 2011/0264786 | A1 | 10/2011 | Kedem et al. |
| 2012/0110086 | A1 | 5/2012 | Baitinger et al. |
| 2012/0110572 | A1 | 5/2012 | Kodi et al. |
| 2012/0185913 | A1 | 7/2012 | Martinez et al. |
| 2013/0014104 | A1 | 1/2013 | Natanzon et al. |
| 2014/0331221 | A1 | 11/2014 | Dong et al. |

OTHER PUBLICATIONS

Appendix 1844, Case 2016-1856, Document 70-2, filed May 8, 2017.

Appendix 1844, Case 2016-1856, Document 71-2, filed May 9, 2017.

Corrected EMC Opening Brief, dated Sep. 16, 2016.

Corrected Non-Confidential Brief for Cross-Appellants EMC Corporation and EMC Israel Development Center LTD, Appeals from the United States District Court for the District of Delaware in No. 1:12-cv-00956-GMS, Judge Gregory M. Sleet, dated Sep. 16, 2016.

Declaration of Allan Lipka before Patent Trial and Appeal Board, Patent Interference No. 106,070, dated Jun. 28, 2017.

Declaration of Christos Karamanolis, PH.D., Patent Interference, 106,070, dated Jun. 27, 2017.

Declaration of Ian Jestice, Patent Interference No. 106,070, dated Jul. 6, 2017.

Declaration of James Dowell before Patent Trial and Appeal Board, Patent Interference No. 106,070, dated Jun. 29, 2017.

Declaration of Jeremy Tigan in support of EMC's Renewed Motion for an Ongoing Royalty Rate Covering Post-Judgment Sales in United States District Court for Delaware case 1:12-cv-00956-GMS dated Jul. 22, 2016, Part 2 of 2.

Declaration of Jeremy Tigan in support of EMC's Renewed Motion for an Ongoing Royalty Rate Covering Post-Judgment Sales in United States District Court for Delaware case 1:12-cv-00956-GMS, dated Jul. 22, 2016, Part 1 of 2.

Declaration of John Blumenthal, dated Jul. 28, 2017.

Declaration of Matan Gilat before Patent Trial and Appeal Board, Patent Interference No. 106,070, dated Jun. 29, 2017.

Declaration of Matt Amdur before Patent Trial and Appeal Board, Patent Interference No. 106,070, dated Jun. 29, 2017.

Declaration of Oded Kedem in Support of Zerto's Opposition to EMC's Renewed Motion for an Ongoing Royalty Rate covering Post Judgement Sales in United States District Court for Delaware Case 1:12-cv-00956-GMS, dated Sep. 1, 2016.

Declaration of Thomas R. Galligan before Patent Trial and Appeal Board, Patent Interference No. 106,070, dated Jul. 6, 2017.

(56) References Cited

OTHER PUBLICATIONS

Declaration of Ziv Kedem in Support of Zerto's Opposition to EMC's Renewed Motion for an Ongoing Royalty Rate Covering Post Judgment Sales in the United States District Court for Delaware Case 1:12-cv-00956-GMS, dated Sep. 1, 2016.
Declaration-Bd.R. 203(b) USPTO *Natanzon* (U.S. Appl. No. 13/404,129) *et al* v *Kedem* (U.S. Appl. No. 13/039,446), dated Jan. 17, 2017.
Defendant Zerto, Inc.'s Notice of Appeal in the United States District Court for the District of Delaware, Case No. 12-956-GMS, dated Sep. 7, 2017.
Defendant Zerto, Inc.'s. Notice of Appeal in the United States District Court, dated Sep. 7, 2017.
Defendant Zerto's Answering Brief in Opposition to Plaintiffs Motion Concerning an Ongoing Royalty Rate Covering Post Judgment Sales in United States District Court for Delaware Case 1:12-cv-00956-GMS dated Sep. 1, 2016.
Defendant Zerto's Notice of Appeal, Case 1:12-cv-00956-GMS, dated Sep. 7, 2017.
Defendant Zerto's Objections to Plaintiffs Bill of Costs, Case 1:12-cv-00956-GMS, dated Aug. 21, 2017.
E-mail from Allan Lipka dated Apr. 4, 2006, Re: Ezra Tech DD Presentation.
E-mail from Allan Lipka dated Feb. 28, 2006, Re:Topio.
E-mail from Chen Burshan dated Aug. 17, 2006, Re:Version 2.3 core documents.
E-mail from Christos Karamanlis dated Apr. 3, 2006, Ezra Feedback.
E-mail from Christos Karamanolis dated Mar. 9, 2006, Kashya scalability testing.
E-mail from Christos Karamanolis, dated Jan. 30, 2016. Fw:Disaster Recovery.
E-mail from Karthik Rau dated Mar. 15, 2006, Re: Updated Docs.
EMC's Motions to Supplement the Record on its Motion for Permanent Injunction, dated Dec. 4, 2015.
EMC's Opening Brief in Support of its Renewed Motion for an Ongoing Royalty Rate Covering Post Judgment Sales in United States District Court for Delaware case 1:12-cv-00956-GMS, dated Jul. 22, 2016.
EMC's Reply Brief in Support of its Renewed Motion for an Ongoing Royalty Rate Covering Post-Judgment Sales in the United States District Court for Delaware Case 1:12-cv-00956-GMS, dated Oct. 4, 2016.
EMC's Reply Brief, dated Jan. 11, 2017.
EMC's Reply in Support of Its Motion to Supplement the Record on Its Motion for a Permanent Injunction, dated Jan. 4, 2016.
EMC's Response Letter regarding Ongoing Royalty Rates. Case 1:12-cv-00956-GMS, dated Aug. 9, 2017.
Entry of Appearance for Thomas A. Brown in the United States Court of Appeals for the Federal Circuit, Case No. 16-1856, 16-1883, Apr. 29, 2016.
Exhibit 2025, E-mail from Allan Lipka dated Apr. 6, 2008, Ezra Feedback.
Exhibit 2026, E-mail from Shlomo Ahal dated Jun. 4, 2006, summaries for Shlomo's trip.
Exhibit 2027, VMware summary word attachment to E-mail from S. Ahal dated Jun. 4, 2006, Patent Interference No. 106,070.
Exhibit 2028—VMware summary—Boston meetings attached to Jun. 4, 2016 E-mail from Sh.Ahal.
Exhibit 2029, Possible Configurations of a K-Based ESX DR Solution v.1, dated Apr. 14, 2006.
Exhibit 2030, Word attachment to Jun. 21, 2006 E-mail from J. Blumenthal, Possible Configurations of a Kashya-based ESX DR solution v.2.
Exhibit 2031, Word attachment to Jun. 21, 2006 E-mail from J. Blumenthal, Possible Configurations of a Kashya based ESX Dr Solution, with comments.
Exhibit 2032, E-mail from John Blumenthal dated Jun. 21, 2006, Integration Discussion Notes.
Exhibit 2033, E-mail from Ziv Kedem dated Aug. 15, 2006, VMware Kashya Summary.
Exhibit 2034, Word attachment to Aug. 15, 2006 E-mail from Z Kedem.
Exhibit 2035 E-mail from Narasimha Raghunandana dated Aug. 15, 2006, Kashya binary that can be installed in a virtual machine.
Exhibit 2036, E-mail from Shlomo Ahal dated Aug. 28, 2006, iKVM Workplan.
Exhibit 2037, E-mail from Shlomo Ahal dated Sep. 13, 2006, Fw:proj plan.
Exhibit 2038, Word attachment to Sep. 13, 2006 E-mail from Shlomo Ahal, Disaster Recovery Project Plan.
Exhibit 2039, Kashya in VM Performance Evaluation, dated Jan. 19, 2017.
Exhibit 2040, E-mail from Matt Amdur dated Feb. 20, 2007, KVM iSCI stability.
Exhibit 2041, Santorini Functional Specifications Document, dated Jul. 10, 2007.
Exhibit 2042, E-mail from Tzach Schechner dated Mar. 1, 2007, Kashya org chart.
Exhibit 2043, E-mail from Allan Lipka dated Apr. 4, 2006, Diligence Follow Up Questions.
Exhibit 2044, E-mail from Yair Heller dated Apr. 6, 2006, Diligence follow up questions.
Exhibit 2045, E-mail from Karthik Rau dated Mar. 16, 2006, Fw: Kashya scalability testing.
Exhibit 2046, Initial Complaint in United States District Court for Delaware, dated Jul. 20, 2012.
Exhibit 2047, First Amended Complaint in United States District Court for Delaware 1-12-cv-00956-GMS/, dated Aug. 19, 2013.
Exhibit 2048, Zerto's Amended Answer to the First Amended Complaint, Affirmative Defenses, and Counterclaims 1-12-cv-00956-GMS, dated Aug. 7, 2014.
Exhibit 2051. Federal Circuit Affirmance Judgement 1-12-cv-00956-GMS, Jun. 12, 2017.
Exhibit 2052, LinkedIn profile of Shlomo Ahal, dated Jun. 13, 2017.
Exhibit 2053, Zerto Hypervisor-Based Replication, dated Jun. 23, 2017.
Exhibit 2056, Zerto's Non-provisional Application 13039446, filed Mar. 3, 2011.
Exhibit 2061, LinkedIn profile of Tzach Schechner, dated Jun. 26, 2017.
Exhibit A "Trade in Trade Up", dated Dec. 21, 2015.
Exhibit A "United States Patent and Trademark Office; *Hughes Networks Systems LLC* v *California Institute of Technology*", dated Jan. 5, 2016.
Exhibit A Case 1:12-cv-00956-GMS, dated Jul. 22, 2016.
Exhibit A Case 1:12-cv-00956-GMS, dated Sep. 1, 2016.
Exhibit B Case 1:12-cv-00956-GMS, dated Jul. 22, 2016.
Exhibit B Case 1:12-cv-00956-GMS, dated Sep. 1, 2016.
Exhibit M, Case 1:12-cv-00956-GMS dated Oct. 4, 2016.
Exhibit N, Case 1:12-cv-00956-GMS, dated Oct. 4, 2016.
Exhibits A-E, dated Dec. 4, 2015.
Ezra PowerPoint attachment to Apr. 4, 2006 E-mail from Allan Lipka, Kashya Company Overview.
Initial Conference Call Transcript of Mar. 16, 2017 Before Hon Sally Gardner Lane, Patent Interference No. 106,070.
Kashya Architecture PowerPoint attachment to Apr. 4, 2006 E-mail from A. Lipka.
Kashya KBX5000 Product Release 2.0 Administrators Guide, dated Nov. 15, 2004.
Kashya KBX5000 Product Release 2.3 Administrators Guide, dated Jul. 11, 2006.
Kashya KBX5000 Version 2.3 Release Notes, dated May 15, 2006.
Kedem Annotated Claims, Patent Interference No. 106,070, dated Feb. 14, 2017.
Kedem Clean Claims, Patent Interference No. 106,070, dated Jan. 31, 2017.
Kedem Exhibit 1001, LinkedIn Page of Matan Gilat, dated Sep. 13, 2017.
Kedem Exhibit 1003, U.S. Patent Application No. 2009/0254582 A1, published Oct. 8, 2009.

(56) References Cited

OTHER PUBLICATIONS

Kedem Exhibit 1004, Declaration of Ziv Kedem, dated Oct. 20, 2017.
Kedem Exhibit 1005, Declaration of Oded Kedem, dated Oct. 20, 2017.
Kedem Exhibit 1006, Declaration of Matthew D. Green, dated Oct. 20, 2017.
Kedem Exhibit 1007, Priority Statement for Provisional Patent Application, dated Mar. 16, 2010.
Kedem Exhibit 1008, Executed Acknowledgement of No Contribution, Nov. 7, 2009.
Kedem Exhibit 1009, Declaration and Power of Attorney for U.S. Appl. No. 13/404,129, filed Feb. 14, 2012.
Kedem Exhibit 1011, Zerto, Inc. Investor Deck, dated Mar. 2010.
Kedem Exhibit 1013, Zerto Overview, dated Mar. 2010.
Kedem Exhibit 1014, Zerto—Addressing the needs of Virtual Mission Critical Applications and Cloud, web.archive.org., dated Oct. 16, 2017.
Kedem Exhibit 1015, Dictionary of Computer and Internet Terms., Ninth Edition, Douglas A. Downing, et al. pp. 138, 156 (2006).
Kedem Exhibit 1016, Small Computer System Interface-2, American National Standard for Information Systems, dated Jan. 31, 1994.
Kedem Exhibit 1023, "Zerto Wins Best of Show and Gold Awards at VMworld 2011", www.web.archive.org.
Kedem Exhibit 1025, Taylor, Colleen, "Red-hot DotCloud is Structure 2011 Launchpad Winner", Gigaom.com, dated Jun. 23, 2011.
Kedem Exhibit 1026, Application Data Sheet and Information Disclosure Statement filed for U.S. Appl. No. 13/039,446, dated Mar. 3, 2011.
Kedem Exhibit 1028, Yager, Tom, "Virtualization and I/O", Ahead of the Curve, InfoWorld, 25, 15: ProQuest, p. 26, dated Apr. 10, 2006.
Kedem Exhibit 1029, E-mail from Ziv Kedem, Subject: Congratulations on our first Alpha, dated Nov. 3, 2010.
Kedem Exhibit 1030, E-mail from Ziv Kedem, Subject: Installation Calendar, dated Oct. 14, 2010/.
Kedem Exhibit 1031, E-mail from Oded Kedem, Subject: Rescheduling the Zerto install, dated Nov. 1, 2010.
Kedem Exhibit 1033, Micah Sherr, et al., "Signaling vulnerabilities in wiretapping systems", University of Pennsylvania, dated Nov. 8, 2005.
Kedem Exhibit 1034, VMware ESX Server, *Natanzon v. Kedem*, Interference No. 106,070.
Kedem Exhibit List, Patent Interference No. 106,070, dated Oct. 20, 2017.
Kedem List of Proposed Motions, Patent Interference No. 106,070, dated Mar. 8, 2017.
Kedem Notice of Related Proceedings, Patent Interference No. 106,070, dated Jan. 31, 2017.
Kedem Objections to the Admissibility of Natanzon's Evidence—for exhibits and materials submitted with Natanzon Motions 1 and 2, Patent Interference No. 106,070, dated Jul. 14, 2017.
Kedem Opposition 1, *Kedem V. Assaf Natanzon* before the Patent Trial and Appeal Board, dated Oct. 20, 2017.
Kedem Opposition 2, *Kedem V. Assaf Natanzon* before the Patent Trial and Appeal Board, dated Oct. 20, 2017.
Letter to Court from EMC regarding Aug. 16 letter to stay Case1:12-cv-00956-GMS, dated Aug. 18, 2016.
Letter to Court from Zerto regarding staying brief regarding Royalty Rate Case1:12-cv-00956-GMS, dated Aug. 16, 2015.
Letter to Judge from EMC regarding Court of Appeals Federal Circuit Order, Case 1:12-cv-00956-GMS, dated Jun. 19, 2017.
Letter to Judge Sleet from Adam Poff Regarding Defendants Response to Plaintiffs Letter of Jun. 19, 2017, Case 1:12-cv-00956-GMS, dated Aug. 21, 2017.
Memorandum regarding Royalties, Case 1:12-cv-00956-GMS, dated Aug. 10, 2017.
Memorandum United States District Court Delaware, dated Mar. 31, 2016.
Natanzon Annotated Claims, Patent Interference No. 106,070, dated Feb. 14, 2017.
Natanzon Clean Claims, Patent Interference No. 106,070, dated Feb. 1, 2017.
Natanzon Exhibit 2008, Zerto U.S. Appl. No. 13/039,446 published as US 2011/0231841, dated Nov. 22, 2011.
Natanzon Exhibit 2050, *EMC v. Zerto*, Judgment, dated May 21, 2015.
Natanzon Exhibit 2054, U.S. Appl. No. 61/314,589, filed Mar. 17, 2010.
Natanzon Exhibit 2055, USPTO Pair Notice of Recordation of Assignment tab of Zerto U.S. Appl. No. 61/314,589, dated Jun. 10, 2017.
Natanzon Exhibit 2058, EMC U.S. Appl. No. 13/404,129 as Published US 20130014104 A1, dated Jan. 10, 2013.
Natanzon Exhibit 2062, Petition Under 37 C.F.R. and 1.47 A for U.S. Appl. No. 13/404,129, dated Aug. 14, 2012.
Natanzon Exhibit 2063, Employment Agreement of Oded Kedem, dated May 9, 2006.
Natanzon Exhibit 2064, Inventions Assignment, Nondisclosure and Noncompetition Agreement between Kashya Ltd. and Shlomo Ahal, dated May 8, 2006.
Natanzon Exhibit 2065, EMC International Key Employee Agreement of Tzach Shechner, dated May 22, 2006.
Natanzon Exhibit 2067, Statement of Facts Submitted with Petition for Application on Behalf of Nonsigning Inventors, dated Aug. 10, 2012.
Natanzon Exhibit 2068, Exhibit A Declaration, Power of Attorney and Assignment signed by Assaf Natanzon on Oct. 6, 2012, and Christos Karamanolis on Jul. 10, 2012.
Natanzon Exhibit 2069, Renewed Petition, dated Sep. 5, 2012.
Natanzon Exhibit 2070, USPTO Decision on Renewed Petition, mailed Sep. 21, 2012.
Natanzon Exhibit 2071, Response to Non-Final Office Action for U.S. Appl. No. 13/404,129, dated Nov. 18, 2015.
Natanzon Exhibit 2072, Supplemental Application Data Sheet, dated Jul. 11, 2017.
Natanzon Exhibit List, Patent Interference No. 106,070, dated Jul. 7, 2017.
Natanzon List of Proposed Motions, Patent Interference No. 106,070, dated Mar. 8, 2017.
Natanzon Motion 1, Patent Interference No. 106, 070, dated Jul. 7, 2017.
Natanzon Motion 2 (to correct inventorship), Patent Interference No. 106,070, dated Jul. 7, 2017.
Natanzon Notice of Related Proceedings, Patent Interference No. 106,070, dated Feb. 1, 2017.
Natanzon Priority Statement, Patent Interference No. 106, 070, dated Jul. 7, 2017.
Natanzon Request for File Copies, Patent Interference No. 106,070, dated Feb. 1, 2017.
Natanzon Updated Exhibit List, Patent Interference No. 106,070, dated Jul. 11, 2017.
Natanzon, Exhibit 2073, Authorization to Charge Fees for Correction of Inventorship, dated Jul. 11, 2017.
Natazon Notice of Notice of Filing Deposition Transcripts, Patent Interference No. 106,070, dated Oct. 19, 2017.
Non-Confidential Joint Appendix in the U.S. Court of Appeals for Federal Circuit, Case 16-1856, Document 52-1, Appx2344-4106, pp. 176-350, filed Jan. 18, 2017.
Non-Confidential Joint Appendix in the U.S. Court of Appeals for the Federal Circuit, Case No. 2016-1856, -1883, vol. I of III, Appx1-1597, Document 51-1, pp. 1-160, filed Jan. 18, 2017.
Non-Confidential Joint Appendix in the U.S. Court of Appeals for the Federal Circuit, Case No. 2016-1856, -1883, vol. III of III, Document 56-3, Appx4884-5884, pp. 1-148, filed Jan. 18, 2017.
Non-Confidential Joint Appendix in the U.S. Court of Appeals for the Federal Circuit, Case No. 2016-1856, -1883,vol. II of III, Appx 1616-4883, Document 56-2, pp. 1-225, filed Jan. 18, 2017.
Non-Confidential Joint Appendix in the United States Court of Appeals for the Federal Circuit, Case No. 2016-1856, -1883, Document 56-2, pp. 229-451, filed Jan. 18, 2017.

(56) References Cited

OTHER PUBLICATIONS

Non-Confidential Joint Appendix U.S. Pat. No. 6,073,209 in the United States Court of Appeals for the Federal Circuit, Case No. 2016-1856, -1883, Appx2628, Document 52-3, Part 2 of 3, Jan. 18, 2017.
Non-Confidential Joint Appendix U.S. Pat. No. 7,603,395 B1 in the United States Court of Appeals for the Federal Circuit Case No. 2016-1856, -1883, Appx5358, filed Jan. 18, 2017.
Non-Confidential Joint Appendix U.S. Pat. No. 7,603,395 B1 in the United States Court of Appeals for the Federal Circuit Case No. 2016-1856, -1883, Document 51-2, Appx147, pp. 1-456, filed Jan. 18, 2017.
Notice of Allowance on U.S. Appl. No. 13/175,898 dated Mar. 29, 2017 (9 pages).
Office Action on U.S. Appl. No. 13/175,898 dated Nov. 4, 2016 (11 pages).
Office Action on U.S. Appl. No. 15/240,847 dated May 15, 2017 (12 pages).
Opposition of Cross-Appellants EMC Corporation and EMC Israel Development Center Ltd. to Appellant Zerto, Inc.'s Motion for Extension of Time to File Its Response/Reply Brief, Appeals from the United States District Court for the District of Delaware in No. 1:12-cv-00956-GMS, Judge Gregory M. Sleet, dated Sep. 30, 2016.
Order Authorizing Office Records, Patent Interference No. 106,070, filed Feb. 2, 2016.
Order Granting Extension of Time to file Opening Brief, dated May 11, 2016.
Order Miscellaneous Bd. R. 104a, *Natanzon* V. *Kedem*, dated Jul. 11, 2017.
Order Motion Times Mar. 16 Call, Patent Interference No. 106,070, entered Mar. 20, 2017.
Order on Motion, United States Court of Appeals for the Federal Circuit, Case No. 2016-1856,-1883, dated Oct. 5, 2016.
Order regarding Post-Trial Motion, dated, Mar. 31, 2016.
Plaintiff EMC and EMC Israel Development Center Ltd., Bill of Costs in the United States District Court for Delaware, Case 1:12-cv-00956-GMS, dated Aug. 8, 2017.
PowerPoint attachment to Jan. 30, 2006 email from Christos Karamanlis. Project: Ezra Technical Due Diligence Meeting Notes, dated Mar. 28-31, 2006.
Standing Order Before the Board of Patent Appeals and Interferences, entered Mar. 8, 2011.
Supplement to Natanzon Motion 2, dated Jul. 11, 2017.
U.S. Notice of Allowance on U.S. Appl. No. 13/175,892 dated Oct. 17, 2017 (5 pages).
U.S. Notice of Allowance on U.S. Appl. No. 13/175,892 dated Oct. 3, 2017 (8 pages).
U.S. Office Action on U.S. Appl. No. 14/831,623 dated Jul. 31, 2017 (7 pages).
U.S. Office Action on U.S. Appl. No. 15/231,388 dated Aug. 29, 2017 (10 pages).
U.S. Office Action on U.S. Appl. No. 15/240,847 dated Oct. 23, 2017 (23 pages).
Word attachment to Mar. 15, 2006 email from K. Rau, ESX Disaster Recovery Roadmap.
Zerto Continuation U.S. Patent Application as published US20160357593 A1, dated Oct. 8, 2016.
Zerto, Inc.'s Appeal Brief in the United States District Court for the District of Delaware in No. 1:12-cv-00956-GMS, Judge Gregory M. Sleet, dated Aug. 5, 2016.
Zerto's Appeal Brief, dated Aug. 5, 2016.
Zerto's Corrected Response and Reply Brief, dated Dec. 21, 2016.
Zerto's Motion for Extension of Time to file its Initial Brief, dated May 4, 2016.
Zerto's Opposition to the EMC Motion to Supplement the Record, dated Dec. 21, 2015.
"Zerto Hits Triple-Digit Growth Once Againl Builds Toward a Future of Uninterrupted Technology," Zerto, Feb. 3, 2015, 2 pages.
A Comparison of Hypervisor-based Replication vs. Current and Legacy BC/DR Technologies, 2012.
Amendment "B" and Response to Office Action from Prosecution History of U.S. Pat. No. 7,603,395, Apr. 9, 2009, (13 pages).
Amendment "E" and Response to Office Action from Prosecution History of U.S. Pat. No. 7,971,091., Nov. 19, 2010, (14 pages).
Amendment and Response to Office Action from Prosecution History of U.S. Pat. No. 7,647,460, Aug. 30, 1999(22 pages).
Answer Claim Construction Brief of Plaintiffs *EMC Corporation and EMC Israel Development Center, Ltd., EMC Corporation and EMC Israel Development Center, Ltd.*, v. *Zerto, Inc.*, Case No. 12-956(GMS), May 9, 2014, (24 pages).
Appellants' Brief Pursuant to 37 C.F.R section 1.192 from Prosecution History of U.S. Pat. No. 7,647,460., May 9, 2002, (34 pages).
Choosing a VSS Provider Veeam Backup Guide for HyperV, Mar. 18, 2015.
Complaint, *EMC Corporation and EMC Israel Development Center, Ltd.*, v. *Zerto, Inc.*, Case No. Demand for Jury Trial, Jul. 20, 2012, (13 pages).
Defendant Zerto, Inc.'s Amended Answer to the First Amended Complaint, Affirmative Defense, and Counterclaims, *EMC Corporation and EMC Israel Development Center, Ltd.*, v. *Zerto, Inc.*, Case No. 12-956-GMS, Aug. 7, 2014, (34 pages).
Defendant Zerto, Inc.'s Claim Construction Answering Brief, *EMC Corporation and EMC Israel Development Center, Ltd.*, v. *Zerto, Inc.*, Case No. 12-956 (GMS), May 9, 2014, (23 pages).
Defendant Zerto, Inc.'s Opening Brief in Support of its Motion for Leave to Amend its Answer to the First Amended Complaint, Affirmative Defense and Counterclaims, *EMC Corporation and EMC Israel Development Center, Ltd.*, v. *Zerto, Inc.*, Case No. 12-956-GMS, Jun. 6, 2014, (24 pages).
Defendant Zerto, Inc.'s Opening Claim Construction Brief., *EMC Corporation and EMC Israel Development Center, Ltd.*, v. *Zerto, Inc.*, Case No. 12-956(GMS), Apr. 11, 2014, (26 pages).
Defendant Zerto, Inc.'s Reply Brief in Support of its Motion for Leave to Amend its Answer to the First Amended Compliant, Affrimative Defense and Counterclaims, *EMC Corporation and EMC Israel Development Center, Ltd.*, v. *Zerto, Inc.*, Case No. 12-956-GMS, Jul. 9, 2014, (16 pages).
Defendant Zerto, Inc's Motion for Judgment as a Matter of Law of No Willful Infringement of the '867 Patent . . . , Apr. 30, 2015.
Defendant's Answering Brief in Opposition to Plaintiffs' Motion to Strik and Dismiss Defendant's Affirmative Defense and Counterclaims of "Invalidity" based on Assignor Estoppel, *EMC Corporation and EMC Israel Development Center, Ltd.*, v. *Zerto, Inc.*, Case No. 12-956(GMS), Nov. 5, 2012, (21 pages).
Deploy Hyper-V Replica, published May 31, 2012.
Double-Take Availability for vSphere: Technical Data Sheet, 2014.
EMC Corporation and EMC Israel Development Center, Ltd.'s ANswer to the Amended Counterclaims of Zerto Inc., *EMC Corporation and EMC Israel Development Center, Ltd.*, v. *Zerto, Inc.*, Case No. 12-956-GMS, Aug. 25, 2014, (12 pages).
EMC Recoverpoint Family, 2012.
EMC Recoverpoint for Virtual Machines: Protects and Recovers VMs to Any Point in Time, 2012.
EMC's Answer Brief in Opposition to Zerto's Motion for Judgment on the Pleadings on Count III o fthe First Amended Complaint, *EMC Corporation and EMC Israel Development Center, Ltd.*, v. *Zerto, Inc.*, Case No. 12-956-GMS, Aug. 11, 2014, (25 pages).
EMC's Answering Brief in Opposition of Zerto's Renewed Motion for Judgment as a Matter of Law or, in the Alternative, for a New Trial, Jul. 17, 2015.
EMC's Answering Brief in Opposition to Zerto's Motion for a New Trial and to Alter or Amend the Judgment, due to an Inconsistent Verdict, Jul. 17, 2015.
EMC's Answering Brief in Opposition to Zerto's Motion for Leave to Amend its Answer to the First Amended Complaint by Adding an Inequitable Conduct Defense and Counterclaims, *EMC Corporation and EMC Israel Development Center, Ltd.*, v. *Zerto, Inc.*, Case No. 12-956-GMS, Jun. 23, 2014 (25 pages).
EMC's Opening Brief in Support of Its Motion for an Accounting and to Amend the Judgment, Jun. 24, 2015.
EMC's Opening Brief in Support of Its Renewed Motion for Judgment as a Matter of Law, Jun. 5, 2015.

(56) References Cited

OTHER PUBLICATIONS

Failed to Create a Quiesced Snapshot of a VM, Nov. 5, 2014, http://nakivo.com.
Features Nakivo Backup and Replication, accessed Jul. 7, 2015, http:www/nakivo.com/VMware-VM-backup-replication-features.htm.
Final Office Action for U.S. Appl. No. 13/039,446, dated Dec. 30, 2013.
Final Office Action on U.S. Appl. No. 13/175,892 dated Apr. 8, 2016.
Final Office Action U.S. Appl. No. 13/367,448 dated Feb. 13, 2014.
FreezeFrame User's Guide, Version 1.1, Document Version 1.1, 60 pgs, Nov. 1993.
Harper Collins, Collins English Dictionary, Third Edition Updated 1994, Section JA-258-260(3 pages).
HP 3PAR Remote Copy Software User Guide HP 3PAR OS 3.2.1 MU2, copyright 2009.
HP 3PAR Remote Copy Software, 2015, www.hp.com.
Hyper-V Replica Feature Overview, published Feb. 29, 2012.
Illuminata EMC RecoverPoint: Beyond Basics CDP Searched via internet on Nov. 10, 2013.
Is Synchronous Replication Enough, May 29, 2013, http://www.zerto.com/blog/general/is-synchronous-replication-enough.
Joint Appendix of Intrinsic and Dictionary Evidence, *EMC Corporation and EMC Israel Development Center, Ltd., v. Zerto, Inc.*, Case No. 12-956-GMS, May 12, 2014, (366 pages).
Joint Claim Construction Chart, *EMC Corporation and EMC Israel Development Center, Ltd., v. Zerto, Inc.*, Case No. 12-956(GMS), Mar. 21, 2014, (24 pages).
Judgment, May 21, 2015.
Letter regarding EMC's Request to File Summary Judgment Motions—Redacted, dated Feb. 13, 2015, 120 pages.
Letter to Judge Sleet re. *EMC Corporation v. Zerto, Inc.*, Feb. 6, 2015.
Letter to Judge Sleet Regarding EMC's Request for Summary Judgment, Oct. 21, 2014, 120 pages.
Managing VM Data with Tintri, Phillips, John, 2013.
Memorandum, *EMC Corporation and EMC Israel Development Center, Ltd., v. Zerto, Inc.*, Case No. 12-956-GMS, Jul. 31, 2014 (8 pages).
Mendocino: The RecoveryOne Solution, Architecture Guide, 22 pages Product Version 1.0, Jan. 3, 2006.
Merriam-Webster, Inc., Webster's Third New International Dictionary, Section JA-276-279 (4 pages) Copyright 2002.
Microsoft Press, Microsoft Computer Dictionary, Fifth Edition, Section JA-341-343, p. 296 (4 pages) 2002.
NetWorker PowerSnap Module for EMC Symmetrix, Release 2.1 Installation and Administrator's Guide, 238 pgs, printed Sep. 2005.
Notice of Allowance for U.S. Appl. No. 13/175,892 dated Dec. 23, 2014.
Notice of Allowance for U.S. Appl. No. 13/175,898 dated Jul. 16, 2015.
Notice of Allowance for U.S. Appl. No. 13/175,892 dated Apr. 3, 2015.
Notice of Allowance on U.S. Appl. No. 13/367,456 dated May 11, 2016.
Notice of Allowance on U.S. Appl. No. 13/367,448 dated Jul. 28, 2016.
Notice of Allowance on U.S. Appl. No. 14/687,341 dated Aug. 18, 2016.
Notice of Allowance on U.S. Appl. No. 14/687,341 dated Sep. 19, 2016.
Notification Concerning Transmittal of International Preliminary Report on Patentability dated Jan. 7, 2014 in corresponding PCT Application No. PCT/IL2012/000271, 12 pages.
Office Action for U.S. Appl. No. 13/039,446 dated Jun. 6, 2013.
Office Action for U.S. Appl. No. 13/039,446 dated Mar. 4, 2013.
Office Action for U.S. Appl. No. 13/039,446 dated Sep. 1, 2015.
Office Action for U.S. Appl. No. 13/175,892 dated Apr. 18, 2014.
Office Action for U.S. Appl. No. 13/175,892 dated Jun. 21, 2013.
Office Action for U.S. Appl. No. 13/175,898 dated Jul. 17, 2014.
Office Action for U.S. Appl. No. 13/367,448 dated Apr. 26, 2013.
Office Action for U.S. Appl. No. 13/039,446 dated Jan. 2, 2015.
Office Action on U.S. Appl. No. 13/175,892 dated Sep. 1, 2015.
Office Action on U.S. Appl. No. 13/175,898 dated Dec. 18, 2015.
Office Action on U.S. Appl. No. 13/175,898 dated Jul. 7, 2016.
Office Action on U.S. Appl. No. 13/175,898 dated Mar. 25, 2015.
Office Action on U.S. Appl. No. 13/367,448 dated Feb. 3, 2015.
Office Action on U.S. Appl. No. 13/367,456 dated Oct. 1, 2015.
Office Action on U.S. Appl. No. 14/687,341 dated Mar. 3, 2016.
Office Action on U.S. Appl. No. 14/687,341 dated Sep. 11, 2015.
Olzak, T., "Secure hypervisor-based virtual server environments", Feb. 26, 2007. http://www.techrepublic.com/blog/security/secure-hypervisor-based-virtual-server-environments/160.
Opening Brief in Support of Defendant Zerto, Inc.'s Motion for Judgment on the Pleadings on Count III of the First Amended Compliant, *EMC Corporation and EMC Israel Development Center, Ltd., v. Zerto, Inc.*, Case No. 12-956-GMS, Jul. 25, 2014, (19 pages).
Order Construing the Terms of U.S. Pat. No. 7,647,460; 6,073,222; 7,603,395; 7,971,091; and 7,577,867, *EMC Corporation and EMC Israel Development Center, Ltd., v. Zerto, Inc.*, Case No. 12-956-GMS, Sep. 5, 2014, (0 pages).
Plaintiffs EMC Corporation and EMC Israel Development Center, Ltd.'s Opening Claim Construction Brief, *EMC Corporation and EMC Israel Development Center, Ltd.,v. Zerto, Inc.*, Case No. 12-956(GMS), Apr. 11, 2014, (26 pages).
Plaintiff's Motion for Judgment as a Matter of Law Pursuant to Fed. R. Civ. P. 50(a), May 6, 2015.
Plaintiffs' Opening Brief in Support of their Motion to Strike and Dismiss Defendant's Affirmative Defense and Counterclaims of "Invalidity" Based on Assignor Estoppel, *EMC Corporation and EMC Israel Development Center, Ltd., v. Zerto, Inc.*, Case No. 12-956(GMS), Oct. 4, 2012, (18 pages).
Reference Model for Open Storage Systems Interconnection, Mass Storage System Reference Model Version 5, Sep. 1994 (36 pages).
ReplicateVM, Replicate VMs, not LUNS, Jul. 7, 2015, http://www.tintri.com/producs/replicatevm.
Report on the Filing or Determination of an Action Regarding a Patent or Trademark, May 22, 2015.
Revised Joint Claim Construction Chart, *EMC Corporation and EMC Israel Development Center, Ltd., v. Zerto, Inc.*, Case No. 12-956(GMS), Apr. 11, 2014, (19 pages).
Revised Joint Claim Construction Chart, *EMC Corporation and EMC Israel Development Center, Ltd., v. Zerto, Inc.*, Case No. 12-956(GMS), Jun. 6, 2014, (19 pages).
Scalable, High-Performance, and Cost-Effective Remote Replication on Hitachi Unified Storage and Brocade Extension Platforms, 2012, www.brocade.com.
Storage Networking Industry Association Dictionary, http://web.archive.org/web20060220153102/http://www.snia.org/education/dictionary/a, pp. JA-261-273 (13 pages) 2006.
Tech Target Search.,http://searchstorage.techtarget.com/definition/storage-snapshot.html, (p. JA-274) Jul. 2005.
The Kashya KB 4000 Administrator's User Guide Product Release 2.0, 105 pgs, Aug. 2004.
The RecoveryONE Solution, Architecture Guide, Product Version 1.0, 22 pgs, Jan. 2006.
Transcript of Markman Hearing, *EMC Corporation and EMC Israel Development Center, Ltd., v. Zerto, Inc.*, Case No. 12-956-GMS, Jun. 25, 2014 (94 pgs).
Unitrends Enterprise Backup Software and Solutions, 2015, http://www.unitrends.com/products/enterprise-backup-software/unitrends-enterprise-backup.
Unitrends Release 7.3 Beta Now Available, Nov. 26, 2013, http://blogs.unitrends.com/unitrends-release-7-3-beta-now-available/.
VMware vCenter Site Recovery Manager5 with vSphere Replication, 2011.
VMware vSphere Replication 6.0, Apr. 2015.
vReplicator Version 3.0, 2009.
Warrick, et al, "IBM Total Storage Enterprise Storage Server Implementing ESS Copy Services in Open Environments", 642 pgs, IBM Jul. 2004.

(56) References Cited

OTHER PUBLICATIONS

Zerto Announces General Availability of Zerto Virtual Replication Version 4.0, May 5, 2015.
Zerto Inc.'s Motion for Judgment as a Matter of Law, May 6, 2015.
Zerto Raises 26 Million in Series D Financing to Accelerate Hybrid Cloud Adoption, Jun. 18, 2014.
Zerto Virtual Replication Release Notes, 2015.
Zerto, Inc's Brief in Support of Its Motion for a New Trial, and to Alter or Amend the Judgment, Due to an Inconsistent Verdict, Jun. 19, 2015.
Zerto, Inc's Brief in Support of Its Renewed Motion for Judgment as a Matter of Law or, in the Alternative, for a New Trial, Jun. 19, 2015.
Zerto's Hypervisor-based Replication: A New Approach to Business/Continuity Disaster Recovery, 2012.
Zerto's Hypervisor-Based, Enterprise-Class Replication and Continuous Data Protection, 2012.
Zerto's Protect Applications, Not Just Data: BC/DR for Virtualized Applications, 2012.
Zerto's ZVR and Hyper-V, 2014.
Notice of Allowance on U.S. Appl. No. 13/175,892 dated Mar. 2, 2018.
Office Action on U.S. Appl. No. 14/831,623 dated Feb. 22, 2018.
Office Action on U.S. Appl. No. 15/194,097 dated Feb. 20, 2018.
Office Action on U.S. Appl. No. 15/231,388 dated Feb. 23, 2018.
Affidavit of Christopher Butler and Exhibit A regarding Ex. 1, dated Nov. 8, 2017.
Affidavit of Christopher Butler and Exhibit A regarding Exs., dated Nov. 8, 2017.
Clerk's Notice of Deficient Document, dated Nov. 30, 2017.
Declaration of Lisa Kieper, dated Nov. 13, 2017.
Kedem Exhibit 1035, Transcript of Video Deposition of Ziv Kedem, dated Dec. 7, 2017.
Kedem Exhibit 1036, Transcript of Video Deposition of Matthew Green, dated Dec. 13, 2017.
Kedem Exhibit 1037, Transcript of Video Deposition of Oded Kedem, dated Dec. 19, 2017.
Kedem Exhibit 1038, Kedem Objections to the Admissibility of Natanzon's Evidence (for exhibits and materials submitted with Natanzon Motions 1 and 2), dated Jul. 14, 2017.
Kedem Exhibit 1039, Kedem Objections to the Admissibility of Natanzon's Evidence (for exhibits and materials submitted with Natanzon Replies 1 and 2), dated Jan. 12, 2018.
Kedem Miscellaneous Motion 1 (to exclude Natanzon's Evidence, dated Jan. 17, 2018.
Kedem Notice of Filing and Service of Deposition Transcripts, Patent Interference No. 106,070, dated Jan. 5, 2018.
Kedem Notice of Service of Supplemental Evidence, dated Nov. 13, 2017.
Kedem Objections to the Admissibility of Natanzon's Evidence (for exhibits and materials submitted with Natanzon Replies 1 and 2), dated Jan. 12, 2018.
Kedem Opposition to Natanzon Motion to Exclude Evidence, dated Feb. 1, 2018.
Kedem Reply 1 (to Exclude Natanzon Evidence), dated Feb. 7, 2018.
Kedem Request for Oral Argument, dated Jan. 17, 2018.
Kedem Updated Exhibit List, dated Jan. 17, 2018.
Kedem Updated Exhibit List, Patent Interference No. 106,070, dated Jan. 5, 2018.
Natanzon Exhibit 2082, Kedem Opposition 1 to Natanzon Motion for Judgment under 35 U.S.C. sec. 102(f), dated Oct. 20, 2017.
Natanzon Exhibit 2085, Zerto, Manchester VMUG 2014 and Technical Overview.
Natanzon Exhibit 2086, LinkedIn Profile of Darren Swift, Rubrik, Inc., dated Dec. 5, 2017.
Natanzon Exhibit 2087, Cisco MDS 9000 Family SANTap with EMC RecoverPoint Design Guide, dated Apr. 2009.
Natanzon Exhibit 2088, Disk Backup, A look inside continuous data protection software, dated Dec. 6, 2017.
Natanzon Exhibit 2091, Webster's Ninth New Collegiate Dictionary, Miriam-Webster, p. 630 (1990).
Natanzon Exhibit 2094, Denning, Dorothy E., Cryptography and Data Security, Addison-Wesley Publishing Company, Inc., 1982.
Natanzon Exhibit 2095, U.S. Patent Application No. 2007/0220311 A1, published Sep. 20, 2007.
Natanzon Exhibit 2096, Webster's Ninth New Collegiate Dictionary, Miriam-Webster, p. 1206 (1990).
Natanzon Exhibit 2097, Assignment for U.S. Patent Application No. 2011/356,920, Reel 017879 Frame 0115-0117, dated May 12, 2006.
Natanzon Exhibit 2098, US Office Action for U.S. Appl. No. 13/039,446 dated Jan. 2, 2015.
Natanzon Exhibit 2099, Natanzon Objections to the Admissibility of Kedem's Evidence (for exhibits and materials submitted with Kedem Oppositions 1 and 2), dated Oct. 27, 2017.
Natanzon Motion to Exclude, dated Jan. 17, 2018.
Natanzon Notice of Deposition of Oded Kedem, dated Dec. 1, 2017.
Natanzon Notice of Deposition of Professor Matthew Green, dated Dec. 1, 2017.
Natanzon Notice of Deposition of Ziv Kedem, dated Dec. 1, 2017.
Natanzon Notice of Filing Deposition Transcripts, Patent Interference No. 106,070, dated Oct. 19, 2017.
Natanzon Objections to the Admissibility of Kedem's Evidence, for exhibits and materials submitted with Kedem Oppositions 1 and 2, dated Oct. 27, 2017.
Natanzon Opposition to Kedem Miscellaneous Motion 1 (to exclude Natanzon's Evidence), dated Feb. 1, 2018.
Natanzon Reply 1, dated Jan. 9, 2018.
Natanzon Reply 2, dated Jan. 9, 2018.
Natanzon Request for Oral Argument, dated Jan. 17, 2018.
Natanzon Updated Exhibit List, Patent Interference No. 106,070, dated Oct. 19, 2017.
Non-Final Office Action on U.S. Appl. No. 14/831,623 dated Sep. 13, 2018.
Notice of Stipulation to Extend Time Periods 4-6, dated Nov. 30, 2017.
Reply in Support of Natanzon Motion to Exclude, dated Feb. 7, 2018.
Amended Order Governing Mediation Conferences and Meditation Statements for the United States District Court for the District of Delaware Case 1:12-cv-00956-GMS dated Jun. 1, 2016.
Decision—Motion—Bd. R. 5(a): 121(a) (3), Patent Interference No. 106,070, Sep. 18, 2017.
Declaration of Lucas Silva in Support of Zerto's Opposition to EMC's Renewed Motion for An Ongoing Royalty Rate Covering Post Judgment Sales in the United States District Court for Delaware Case 1:12-cv-00956-GMS, Sep. 1, 2016.
Declaration of Nathan Speed in Support of Emc's Reply Brief in Support of its Motion for a Renewed Ongoing Royalty in the United States District Court for Delaware Case 1:12-vc-00956-GMS dated Oct. 4, 2016.
Declaration of Nathan Speed in Support of Plaintiffs Bill of Costs, Case 1:12-cv-00956-GMS, Aug. 8, 2017.
E-mail from Christos Karamanolis, dated Apr. 3, 2006, RE: Ezra feedback.
Email from U.S. Court of Appeals for the Federal Circuit re Nov. 30, 2017 Clerk's Notice of Deficient Document.
Email from USPTO re Mar. 31, 2017 Filing Submission for 106070.
EMC Corporation and EMC Israel Development Center Ltd.'s Docketing Statement in the United States Court of Appeals for the Federal Circuit, Case No. 16/1856, 16/1883, Apr. 29, 2016.
EMC Corporation's Corrected Docketing Statement in the United States Court of Appeals for the Federal Circuit, Case No. 17/2519, Sep. 22, 2017.
EMC's corrected docketing statement dated Sep. 22, 2017.
EMC's Docketing Statement dated Apr. 29, 2016.
EMC's Motions for Redaction of Electronic Transcipts and Notice of Lodging Redacted Transcripts and Proposed Order dated Apr. 19, 2016.
EMC's Notice of Intent to Redact dated Apr. 5, 2016.
EMC's Renewed Motion for an Ongoing Royalty Rate Covering Post-Judgement Sales in the United States District Court for the District of Delaware Case 1:12-cv-00956-GMS dated Jul. 14, 2016.

(56) References Cited

OTHER PUBLICATIONS

Exhibit O, Case 1:12-cv-00956-GMS, Oct. 4, 2016.
Exhibit P, Case 1:12-cv-00956-GMS, Oct. 4, 2016.
Filing Receipt for No. 24, Natanzon V. Kedem.
Interference Efiling Receipt, No. 106070, Jan. 31, 2017.
Judgment—Bd. R. 127 (a), issued in Patent Interference No. 106,070, Dec. 20, 2018.
Judgment from the United States Court of Appeals for the Federal Circuit dated Jun. 12, 2017.
Kedem Notice of Change of Lead and Backup Counsel, Patent Interference No. 106,070 (Sep. 12, 2017).
Kedem Notice of Deposition for Alan Lipka for Sep. 29, 2017, Patent Interference No. 106,070 (Sep. 11, 2017).
Kedem Notice of Deposition for Chris Karamanolis for Sep. 25 and 26, 2017, Patent Interference No. 106,070 (Sep. 11, 2017).
Kedem Notice of Deposition for Ian Jestice for Sep. 28, 2017, Patent Interference No. 106,070 (Sep. 11, 2017).
Kedem Notice of Deposition for Matt Amdur for Sep. 26, 2017, Patent Interference No. 106,070 (Sep. 11, 2017).
Kedem Notice of Deposition of Matan Gilat for Sep. 14, 2017, Patent Interference No. 106,070 (Sep. 11, 2017).
Kedem Notice of Lead and Backup Counsel, Patent Interference No. 106,070, Jan. 31, 2017.
Kedem Notice of Real Party in Interest, Patent Interference No. 106,070, Jan. 31, 2017.
Keaem Notice of Settlement Discussions, Patent Interterence No. 106,070, May 4, 2017.
Kedem Priority Statement, Patent Interference No. 106,070, Filed Jul. 7, 2017.
Kedem Request for File Copies, Patent Interference No. 106,070, Jan. 31, 2017.
Letter from EMC to court enclosing appendix pages dated May 8, 2017.
Letter from Zerto to Court enclosing appendix pages date May 9, 2017.
Mandate from Court of Appeals for Federal Circuit, Case 1:12-cv-00956-GMS, Jul. 19, 2017.
Mandate from United State Court of Appeals for the Federal Circuit dated Jul. 19, 2017.
Natanzon Exhibit 2005, Declaration of Matt Amdur, Patent Interference No. 106,070, Jun. 29, 2017.
Natanzon Exhibit 2006, Declaration of Matan Gilat, Patent Interference No. 106,070, Jun. 29, 2017.
Natanzon Exhibit 2075, Declaration of Nathan R. Speed in Support of Motion for Admission Pro Hac Vice, Patent Interference No. 106,070, Sep. 11, 2017.
Natanzon Exhibit 2076, Transcript of Deposition of Matan Gilat, Sep. 14, 2017.
Natanzon Exhibit 2077, Transcript of Deposition of Allan Lipka, Sep. 28, 2017.
Natanzon Exhibit 2078, Transcript of Deposition of Allan Lipka, Sep. 29, 2017.
Natanzon Exhibit 2079, Transcript of Deposition of Christos Karamanolis, Sep. 25, 2017.
Natanzon Exhibit 2080, Transcript of Deposition of Christos Karamanolis, Sep. 26, 2017.
Natanzon Exhibit 2081, Transcript of Deposition of Matthew Amdur, Sep. 26, 2017.
Natanzon Notice of Change in Lead and Backup Counsel, Patent Interference No. 106,070, Jun. 6, 2017.
Natanzon Notice of Lead and Backup Counsel, Patent Interrerence No. 106,070, Feb. 1, 2017.
Natanzon Notice of Real Party in Interest, Patent Interference No. 106,070, Feb. 1, 2017.
Natanzon Notice of Service of Supplemental Evidence, Patent Interference No. 106,070, dated Jul. 28, 2017.
Natanzon Notice of Serving Priority Statement, Patent Interference No. 106,070, Jul. 10, 2017.
Natanzon Unopposed Miscellaneous Motion 1 (Request for pro hac vice admission of Nathan R. Speed), Patent Interference No. 106,070 (Sep. 12, 2017).
Natanzon Updated Exhibit List, Patent Interference No. 106,070, Jul. 28, 2017.
Natanzon Updated Exhibit List, Patent Interference No. 106,070, Sep. 12, 2017.
Notice of Allowance on U.S. Appl. No. 13/175,892 dated Jun. 14, 2018.
Notice of Allowance on U.S. Appl. No. 13/175,892 dated Oct. 31, 2018.
Notice of Allowance on U.S. Appl. No. 15/194,097 dated Jul. 27, 2018.
Notice of Allowance on U.S. Appl. No. 15/194,097 dated Oct. 16, 2018.
Notice of Allowance on U.S. Appl. No. 15/231,388 dated Aug. 16, 2018.
Notice of Allowance on U.S. Appl. No. 15/231,388 dated Oct. 12, 2018.
Notice of Allowance on U.S. Appl. No. 15/240,847 dated Nov. 15, 2018.
Notice of Appeal by Zerto dated Apr. 14, 2016.
Notice of Docket, United States Court of Appeals for the Federal Circuit, Case 1:12-cv-00956-GMs, Sep. 8, 2017.
Notice of Docketing dated Apr. 15, 2016.
Notice of Docketing dated Apr. 19, 2U16.
Notice of Docketing for the United State Court of Appeals for the Federal Circuit, 17/2519—*EMC Corporation V. Zerto Inc*, Sep. 8, 2017.
Notice of Docketing from the United States District Court for the District of Delaware, *EMC Corporation V. Zerto Inc.*, Case No. 1:12-cv-00956-GMS.
Notice Of Docketing on Septmember 8, 2017 in the United States Court of Appeals for the Federal Circuit.
Notice of Entry of Judgment Without Opinion Entered Jun. 12, 2016, Case 1:12-cv-00956-GMS, Jun. 13, 2016.
Notice of Entry of Judgment without Opinion in the United States Court of Appeals for the Federal Court, Case No. 16/1856, Jun. 12, 2017.
Notice of Judgment without Opinion dated Jun. 12, 2017.
Notice Of Subsequent Authority dated Jan. 5, 2016.
Notice of Withdrawal of Certain Pro Hac Vice Counsel Aaron Moore dated Apr. 11, 2016.
Notice of Withdrawal of Monte Squire dated Nov. 11, 2015.
Order Appellant Zerto's Response and Reply Brief dated Dec. 7, 2016.
Order Governing Mediation Conferences and Mediation Statements dated Apr. 19, 2016.
Order Regarding Royalties in the District Court for Delaware, Case 1:12-cv-009560-GMS, Aug. 10, 2017.
Order rejecting EMC Corporation's Opening Brief in the United States Court of Appeals for the Federal Circuit, Case No. 16/1856, Sep. 15, 2016.
Order Rejecting EMC's Opening Brief dated Sep. 15, 2016.
Order-Miscellaneous- BS.R 104(a), Patent Interference No. 106,070, Filed Jun. 15, 2017.
Plaintiffs Notice of Cross Appeal dated Apr. 18, 2016.
Zerto Inc Docketing Statement dated Apr. 29, 2016.
Zerto, Inc.'s Docketing Statement in the United States Court of Appeals for the Federal Circuit, Case No. 16/1856, 16/1883, Apr. 29, 2016.
Zerto's Docketing Statement dated Sep. 22, 2017.
Zerto's Docketing Statement in the United States Court of Appeals for the Federal Circuit, Case No. 17-2519, Sep. 22, 2017.
Zerto's Notice of Intent to Redact dated Apr. 5, 2016.
Zertos's Citation of Supplemental Authority and Matthew Lowrie's certificate of service dated May 3, 2017.
Final Office Action on U.S. Appl. No. 14/831,623, dated May 6, 2019, 14 pages.
Natanzon Decision on Rehearing—Bd. R. 125(c), Patent Interference No. 106,070, Apr. 30, 2019.
Natanzon Kedem Opposition 5 (to Natanzon Motion 5, Request for Rehearing) Patent Interference No. 106,070, Mar. 8, 2019.

(56) References Cited

OTHER PUBLICATIONS

Natanzon Miscellaneous Motion 5 (Request for Hearing of Decision and Judgement) Patent Interference No. 106,070, Jan. 22, 2019.
Natanzon Order—Authorizing Opposition and Reply—Bd. R. 125(c)(4), Patent Interference No. 106,070, Feb. 6, 2019.
Natanzon Reply 5 (to Opposition to Request for Hearing of Decision and Judgement), Patent Interference No. 106,070, Mar. 22, 2019.
Office Action for U.S. Appl. No. 13/367,448 dated Apr. 26, 2013, 19 pages.

METHODS AND APPARATUS FOR PROVIDING HYPERVISOR LEVEL DATA SERVICES FOR SERVER VIRTUALIZATION

CROSS REFERENCES TO RELATED APPLICATIONS

This application is a continuation of U.S. patent application Ser. No. 14/687,341, titled METHODS AND APPARATUS FOR PROVIDING HYPERVISOR LEVEL DATA SERVICES FOR SERVER VIRTUALIZATION, filed on Apr. 15, 2015, which is a continuation of U.S. patent application Ser. No. 13/175,892, titled METHODS AND APPARATUS FOR PROVIDING HYPERVISOR LEVEL DATA SERVICES FOR SERVER VIRTUALIZATION, filed on Jul. 4, 2011, which is a continuation-in-part of U.S. application Ser. No. 13/039,446, titled METHODS AND APPARATUS FOR PROVIDING HYPERVISOR LEVEL DATA SERVICES FOR SERVER VIRTUALIZATION, filed on Mar. 3, 2011, which claims priority benefit of U.S. Provisional Application No. 61/314,589, titled METHODS AND APPARATUS FOR PROVIDING HYPERVISOR LEVEL DATA SERVICES FOR SERVER VIRTUALIZATION, filed on Mar. 17, 2010. The entire contents of the foregoing applications are herein incorporated by reference.

FIELD OF THE INVENTION

The present invention relates to virtual server computing environments.

BACKGROUND OF THE INVENTION

Data center virtualization technologies are now well adopted into information technology infrastructures. As more and more applications are deployed in a virtualized infrastructure, there is a growing need for recovery mechanisms to support mission critical application deployment, while providing complete business continuity and disaster recovery.

Virtual servers are logical entities that run as software in a server virtualization infrastructure, referred to as a "hypervisor". Examples of hypervisors are VMWARE® ESX manufactured by VMware, Inc. of Palo Alto, Calif., HyperV manufactured by Microsoft Corporation of Redmond, Wash., XENSERVER® manufactured by Citrix Systems, Inc. of Fort Lauderdale, Fla., Redhat KVM manufactured by Redhat, Inc. of Raleigh, N.C., and Oracle VM manufactured by Oracle Corporation of Redwood Shores, Calif. A hypervisor provides storage device emulation, referred to as "virtual disks", to virtual servers. Hypervisor implements virtual disks using back-end technologies such as files on a dedicated file system, or raw mapping to physical devices.

As distinct from physical servers that run on hardware, virtual servers run their operating systems within an emulation layer that is provided by a hypervisor. Although virtual servers are software, nevertheless they perform the same tasks as physical servers, including running server applications such as database applications, customer relation management applications and MICROSOFT EXCHANGE SERVER®. Most applications that run on physical servers are portable to run on virtual servers. As distinct from virtual desktops that run client side applications and service individual users, virtual servers run applications that service a large number of clients.

As such, virtual servers depend critically on data services for their availability, security, mobility and compliance requirements. Data services include inter alia continuous data protection, disaster recovery, remote replication, data security, mobility, and data retention and archiving policies.

Conventional replication and disaster recovery systems were not designed to deal with the demands created by the virtualization paradigm. Most conventional replication systems are not implemented at the hypervisor level, with the virtual servers and virtual disks, but instead are implemented at the physical disk level. As such, these conventional systems are not fully virtualization-aware. In turn, the lack of virtualization awareness creates an operational and administrative burden, and a certain degree of inflexibility.

It would thus be of advantage to have data services that are fully virtualization-aware.

SUMMARY OF THE DESCRIPTION

Aspects of the present invention relate to a dedicated virtual data service appliance (VDSA) within a hypervisor that can provide a variety of data services. Data services provided by the VDSA include inter alia replication, monitoring and quality of service. The VDSA is fully application-aware.

In an embodiment of the present invention, a tapping filter driver is installed within the hypervisor kernel. The tapping driver has visibility to I/O requests made by virtual servers running on the hypervisor.

A VDSA runs on each physical hypervisor. The VDSA is a dedicated virtual server that provides data services; however, the VDSA does not necessarily reside in the actual I/O data path. When a data service processes I/O asynchronously, the VDSA receives the data outside the data path.

Whenever a virtual server performs I/O to a virtual disk, the tapping driver identifies the I/O requests to the virtual disk. The tapping driver copies the I/O requests, forwards one copy to the hypervisor's backend, and forwards another copy to the VDSA.

Upon receiving an I/O request, the VDSA performs a set of actions to enable various data services. A first action is data analysis, to analyze the data content of the I/O request and to infer information regarding the virtual server's data state. E.g., the VDSA may infer the operating system level and the status of the virtual server. This information is subsequently used for reporting and policy purposes.

A second action, optionally performed by the VDSA, is to store each I/O write request in a dedicated virtual disk for journaling. Since all I/O write requests are journaled on this virtual disk, the virtual disk enables recovery data services for the virtual server, such as restoring the virtual server to an historical image.

A third action, optionally performed by the VDSA, is to send I/O write requests to different VDSAs, residing on hypervisors located at different locations, thus enabling disaster recovery data services.

The hypervisor architecture of the present invention scales to multiple host sites, each of which hosts multiple hypervisors. The scaling flexibly allows for different numbers of hypervisors at different sites, and different numbers of virtual services and virtual disks within different hypervisors. Each hypervisor includes a VDSA, and each site includes a data services manager to coordinate the VSDA's at the site, and across other sites.

Embodiments of the present invention enable flexibly designating one or more virtual servers within one or more hypervisors at a site as being a virtual protection group, and flexibly designating one or more hypervisors, or alternatively one or more virtual servers within one or more hypervisors at another site as being a replication target for the virtual protection group. Write order fidelity is maintained for virtual protection groups. A site may comprise any number of source and target virtual protection groups. A virtual protection group may have more than one replication target. The number of hypervisors and virtual servers within a virtual protection group and its replication target are not required to be the same.

There is thus provided in accordance with an embodiment of the present invention a cross-host multi-hypervisor system, including a plurality of host sites, each site including at least one hypervisor, each of which includes at least one virtual server, at least one virtual disk that is read from and written to by the at least one virtual server, a tapping driver in communication with the at least one virtual server, which intercepts write requests made by any one of the at least one virtual server to any one of the at least one virtual disk, and a virtual data services appliance, in communication with the tapping driver, which receives the intercepted write requests from the tapping driver, and which provides data services based thereon, and a data services manager for coordinating the virtual data services appliances at the site, and a network for communicatively coupling the plurality of sites, wherein the data services managers coordinate data transfer across the plurality of sites via the network.

BRIEF DESCRIPTION OF THE DRAWINGS

The present invention will be more fully understood and appreciated from the following detailed description, taken in conjunction with the drawings in which.

LIST OF APPENDICES

Appendix I is an application programming interface for virtual replication site controller web services, in accordance with an embodiment of the present invention;

Appendix II is an application programming interface for virtual replication host controller web services, in accordance with an embodiment of the present invention;

Appendix III is an application programming interface for virtual replication protection group controller web services, in accordance with an embodiment of the present invention;

Appendix IV is an application programming interface for virtual replication command tracker web services, in accordance with an embodiment of the present invention; and Appendix V is an application programming interface for virtual replication log collector web services, in accordance with an embodiment of the present invention.

DETAILED DESCRIPTION

Aspects of the present invention relate to a dedicated virtual data services appliance (VDSA) within a hypervisor, which is used to provide a variety of hypervisor data services. Data services provided by a VDSA include inter alia replication, monitoring and quality of service.

Figure 1:
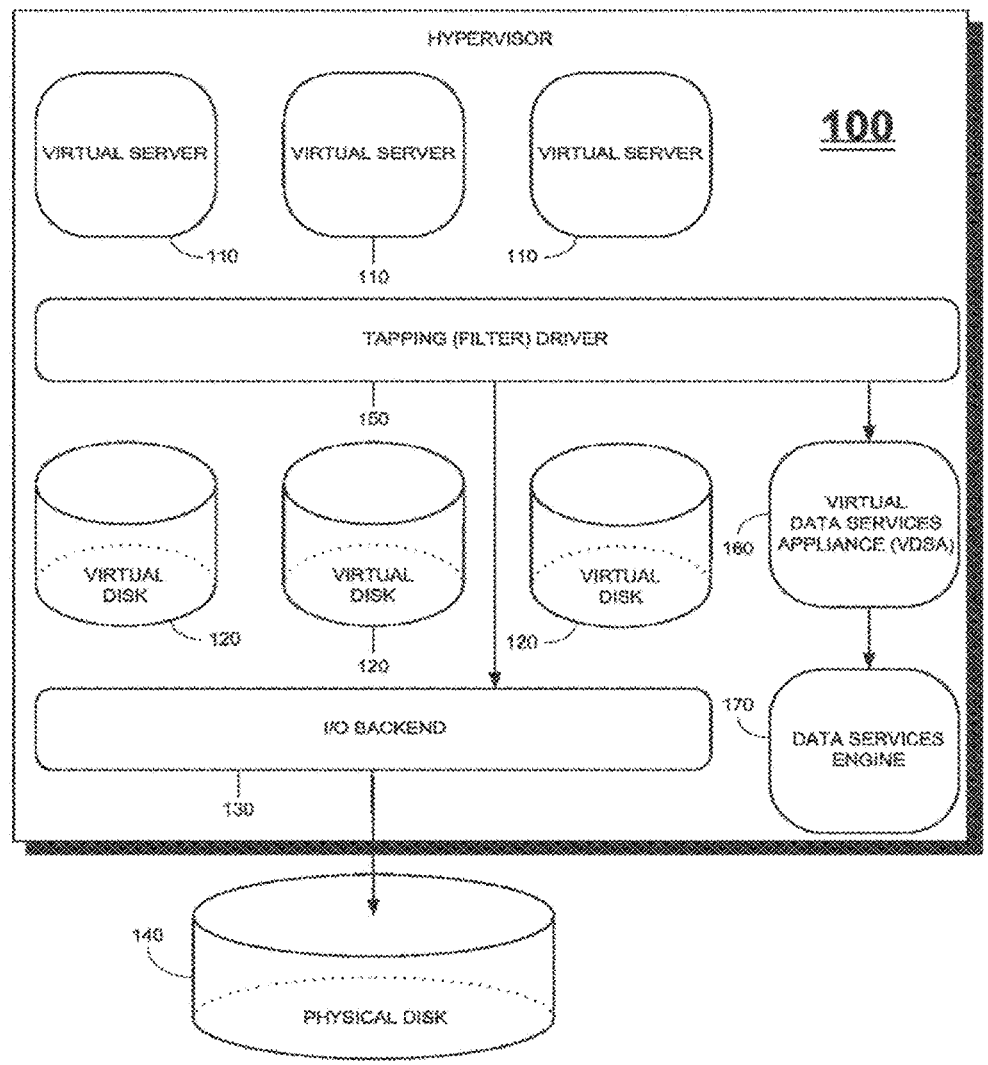
FIG. 1 is a simplified block diagram of a hypervisor architecture that includes a tapping driver and a virtual data services appliance, in accordance with an embodiment of the present invention.

Reference is made to FIG. 1, which is a simplified block diagram of a hypervisor architecture that includes a tapping driver and a VDSA, in accordance with an embodiment of the present invention. Shown in FIG. 1 is a hypervisor 100 with three virtual servers 110, three virtual disks 120, an I/O backend 130 and a physical storage array 140. Hypervisor 100 uses a single physical server, but runs multiple virtual servers 110. Virtual disks 120 are a storage emulation layer that provide storage for virtual servers 110. Virtual disks 120 are implemented by hypervisor 100 via I/O backend 130, which connects to physical disk 140.

Hypervisor 100 also includes a tapping driver 150 installed within the hypervisor kernel. As shown in FIG. 1, tapping driver 150 resides in a software layer between virtual servers 110 and virtual disks 120. As such, tapping driver 150 is able to access I/O requests performed by virtual servers 110 on virtual disks 120. Tapping driver 150 has visibility to I/O requests made by virtual servers 110.

Hypervisor 100 also includes a VDSA 160. In accordance with an embodiment of the present invention, a VDSA 160 runs on a separate virtual server within each physical hypervisor. VDSA 160 is a dedicated virtual server that provides data services via one or more data services engines 170. However, VDSA 160 does not reside in the actual I/O data path between I/O backend 130 and physical disk 140. Instead, VDSA 160 resides in a virtual I/O data path.

Whenever a virtual server 110 performs I/O on a virtual disk 120, tapping driver 150 identifies the I/O requests that the virtual server makes. Tapping driver 150 copies the I/O requests, forwards one copy via the conventional path to I/O backend 130, and forwards another copy to VDSA 160. In turn, VDSA 160 enables the one or more data services engines 170 to provide data services based on these I/O requests.

Figure 2:
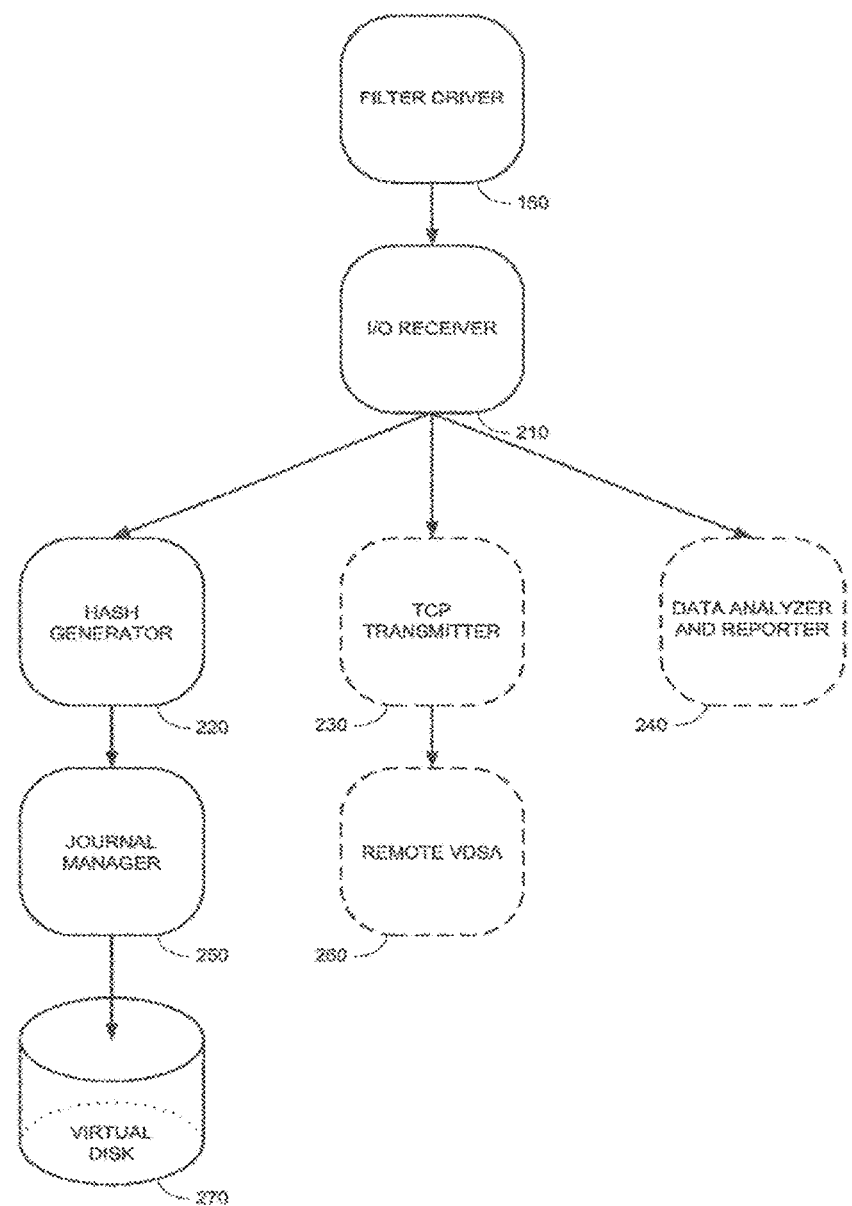
FIG. 2 is a simplified data flow chart for a virtual data services appliance, in accordance with an embodiment of the present invention.

Reference is made to FIG. 2, which is a simplified data flow chart for a VDSA, in accordance with an embodiment of the present invention. Shown in FIG. 2 are an I/O receiver 210, a hash generator 220, a TCP transmitter 230, a data analyzer and reporter 240, a journal manager 250 and a remote VDSA 260. Remote VDSA 260 resides on different physical hardware, at a possibly different location.

As shown in FIG. 2, I/O receiver 210 receives an intercepted I/O request from tapping driver 150. VDSA 160 makes up to three copies of the received I/O requests, in order to perform a set of actions which enable the one or more data services engines 170 to provide various services.

A first copy is stored in persistent storage, and used to provide continuous data protection. Specifically, VDSA 160 sends the first copy to journal manager 250, for storage in a dedicated virtual disk 270. Since all I/O requests are journaled on virtual disk 270, journal manager 250 provides recovery data services for virtual servers 110, such as restoring virtual servers 110 to an historical image. In order to conserve disk space, hash generator 220 derives a one-way hash from the I/O requests. Use of a hash ensures that only a single copy of any I/O request data is stored on disk.

An optional second copy is used for disaster recovery. It is sent via TCP transmitter 230 to remote VDSA 260. As such, access to all data is ensured even when the production hardware is not available, thus enabling disaster recovery data services.

An optional third copy is sent to data analyzer and reporter 240, which generates a report with information about the content of the data. Data analyzer and reporter 240 analyzes data content of the I/O requests and infers information regarding the data state of virtual servers 110. E.g., data analyzer and reporter 240 may infer the operating system level and the status of a virtual server 110.

Figure 3:
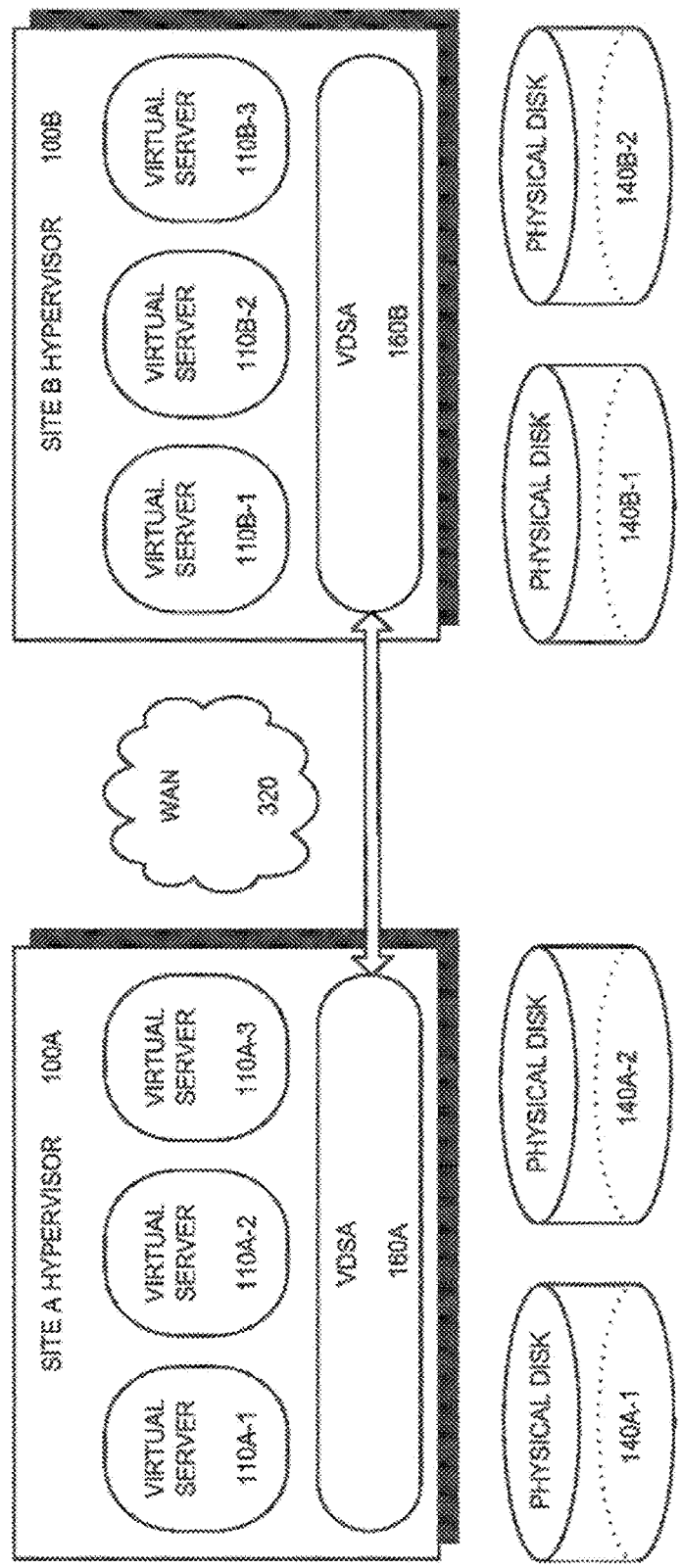
FIG. 3 is a simplified block diagram of a virtual replication system, in accordance with an embodiment of the present invention.

Reference is made to FIG. 3, which is a simplified block diagram of a virtual replication system, in accordance with an embodiment of the present invention. Shown in FIG. 3 is a protected site designated Site A, and a recovery site designated Site B. Site A includes a hypervisor 100A with three virtual servers 110A-1, 110A-2 and 110A-3, and a VDSA 160A. Site A includes two physical disks 140A-1 and 140A-2. Site B includes a hypervisor 100B with a VDSA 160B. Site B includes two physical disks 140B-1 and 140B-2. All or some of virtual servers 110A-1, 110A-2 and 110A-3 may be designated as protected. Once a virtual server is designated as protected, all changes made on the virtual server are replicated at the recovery site.

In accordance with an embodiment of the present invention, every write command from a protected virtual server in hypervisor 100A is intercepted by tapping driver 150 (FIG. 1) and sent asynchronously by VDSA 160A to VDSA 160B for replication, via a wide area network (WAN) 320, while the write command continues to be processed by the protected server.

At Site B, the write command is passed to a journal manager 250 (FIG. 2), for journaling on a Site B virtual disk 270 (FIG. 2). After every few seconds, a checkpoint is written to the Site B journal, and during a recovery one of the checkpoints may be selected for recovering to that point. Additionally, checkpoints may be manually added to the Site B journal by an administrator, along with a description of the checkpoint. E.g., a checkpoint may be added immediately prior to an event taking place that may result in the need to perform a recovery, such as a planned switch over to an emergency generator.

In addition to write commands being written to the Site B journal, mirrors 110B-1, 110B-2 and 110B-3 of the respective protected virtual servers 110A-1, 110A-2 and 110A-3 at Site A are created at Site B. The mirrors at Site B are updated at each checkpoint, so that they are mirrors of the corresponding virtual servers at Site A at the point of the last checkpoint. During a failover, an administrator can specify that he wants to recover the virtual servers using the latest data sent from the Site A. Alternatively the administrator can specify an earlier checkpoint, in which case the mirrors on the virtual servers 110B-1, 110-B-2 and 110B-3 are rolled back to the earlier checkpoint, and then the virtual servers are recovered to Site B. As such, the administrator can recover the environment to the point before any corruption, such as a crash or a virus, occurred, and ignore the write commands in the journal that were corrupted.

VDSAs 160A and 160B ensure write order fidelity; i.e., data at Site B is maintained in the same sequence as it was written at Site A. Write commands are kept in sequence by assigning a timestamp or a sequence number to each write at Site A. The write commands are sequenced at Site A, then transmitted to Site B asynchronously, then reordered at Site B to the proper time sequence, and then written to the Site B journal.

The journal file is cyclic; i.e., after a pre-designated time period, the earliest entries in the journal are overwritten by the newest entries.

It will be appreciated by those skilled in the art that the virtual replication appliance of the present invention operates at the hypervisor level, and thus obviates the need to consider physical disks. In distinction, conventional replication systems operate at the physical disk level. Embodiments of the present invention recover write commands at the application level. Conventional replication systems recover write commands at the SCSI level. As such, conventional replication systems are not fully application-aware, whereas embodiment of the present invention are full application-aware, and replicate write commands from an application in a consistent manner.

The present invention offers many advantages.

Hardware Agnostic: Because VDSA 160 manages recovery of virtual servers and virtual disks, it is not tied to specific hardware that is used at the protected site or at the recovery site. The hardware may be from the same vendor, or from different vendors. As long as the storage device supports the iSCSI protocol, any storage device, known today or to be developed in the future, can be used.

Fully Scalable: Because VDSA 160 resides in the hypervisor level, architectures of the present invention scale to multiple sites having multiple hypervisors, as described hereinbelow with reference to FIG. 4.

Efficient Asynchronous Replication: Write commands are captured by VDSA 160 before they are written to a physical disk at the protected site. The write commands are sent to the recovery site asynchronously, and thus avoid long distance replication latency. Moreover, only delta changes are sent to the recovery site, and not a whole file or disk, which reduces the network traffic, thereby reducing WAN requirements and improving recovery time objective and recovery point objective.

Control of Recovery: An administrator controls when a recovery is initiated, and to what point in time it recovers.

Near-Zero Recovery Point Objective (RPO): VDSA 160 continuously protects data, sending a record of every write command transacted at the protected site to the recovery site. As such, recovery may be performed within a requested RPO.

Near-Zero Recovery Time Objective (RTO): During recovery the mirrors of the protected virtual servers are recovered at the recovery site from VDSA 160B, and synchronized to a requested checkpoint. In accordance with an embodiment of the present invention, during synchronization and while the virtual servers at the recovery site are not yet fully synchronized, users can nevertheless access the virtual servers at the recovery site. Each user request to a virtual server is analyzed, and a response is returned either from the virtual server directly, or from the journal if the information in the journal is more up-to-date. Such analysis of user requests continues until the recovery site virtual environment is fully synchronized.

WAN Optimization between Protected and Recovery Sites: In accordance with an embodiment of the present invention, write commands are compressed before being sent from VDSA 160A to VDSA 160B, with throttling used to prioritize network traffic. As such, communication between the protected site and the recovery site is optimized.

WAN Failover Resilience: In accordance with an embodiment of the present invention, data is cached prior to being transmitted to the recovery site. If WAN 320 goes down, the cached data is saved and, as soon as WAN 320 comes up again, the data is sent to the recovery site and both sites are re-synchronized.

Single Point of Control: In accordance with an embodiment of the present invention, both the protected and the recovery site are managed from the same client console.

Figure 4:
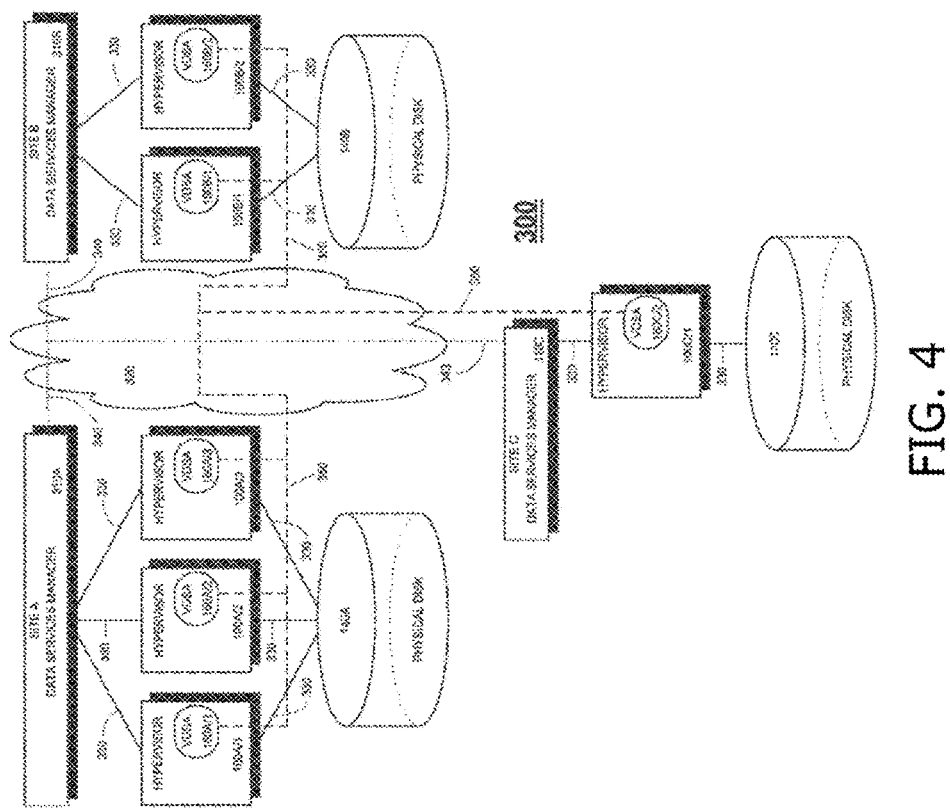
FIG. 4 is a simplified block diagram of a cross-host multiple hypervisor system that includes data services managers for multiple sites that have multiple hypervisors, in accordance with an embodiment of the present invention.

As indicated hereinabove, the architecture of FIG. 1 scales to multiple sites having multiple hypervisors. Reference is made to FIG. 4, which is a simplified block diagram of a cross-host multiple hypervisor system 300 that includes data services managers for multiple sites that have multiple hypervisors, in accordance with an embodiment of the present invention. The architecture of FIG. 4 includes three sites, designated Site A, Site B and Site C, the three sites being communicatively coupled via a network 320. Each site includes one or more hypervisors 100. Specifically, Site A includes three hypervisors, 100A/1, 100A/2 and 100A/3, Site B includes two hypervisors, 100B/1 and 100B/2, and Site C includes one hypervisor 100C/1. The sites have respective one or more physical disks 140A, 140B and 140C.

Figure 7:
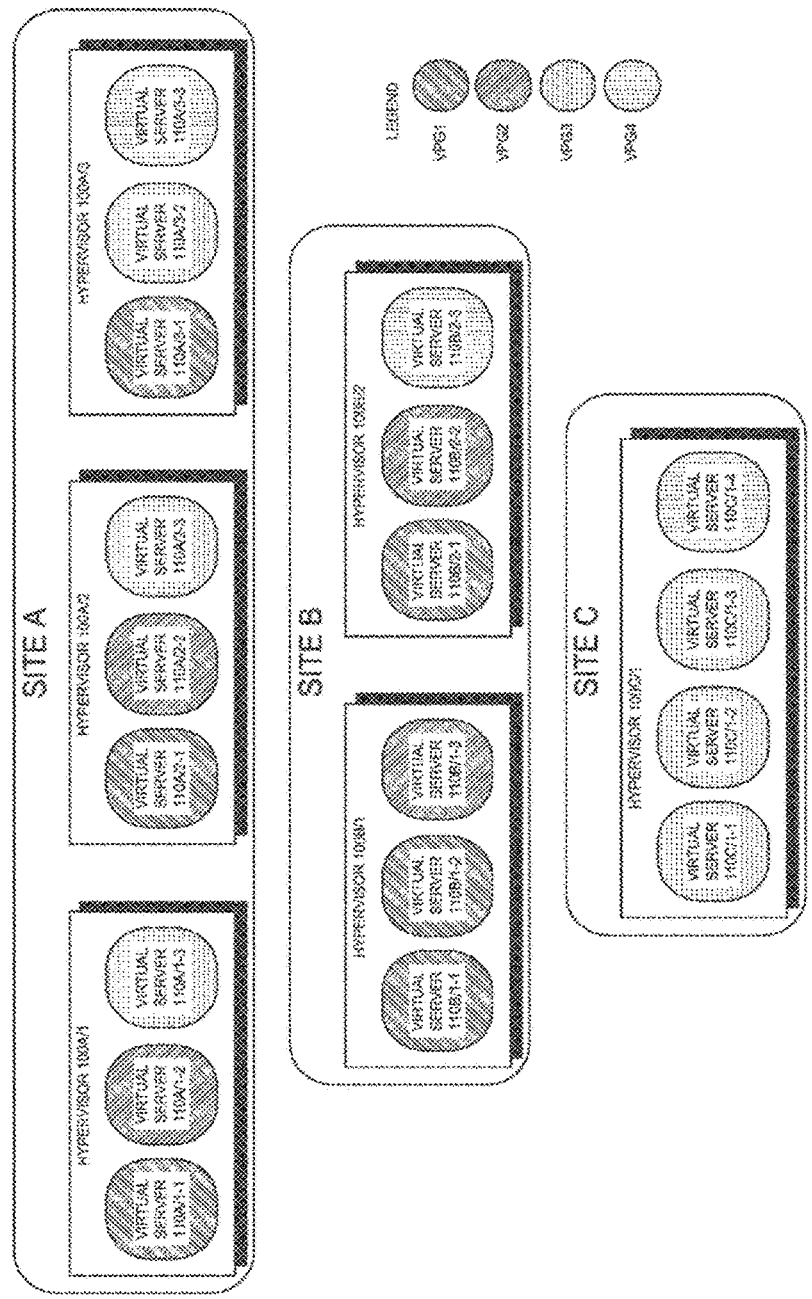
FIG. 7 is an example an environment for the system of FIG. 4, in accordance with an embodiment of the present invention.

The hypervisors are shown in system 300 with their respective VDSA's 160A/1, 160A/2, . . . , and the other components of the hypervisors, such as the virtual servers 110 and virtual disks 120, are not shown for the sake of clarity. An example system with virtual servers 110 is shown in FIG. 7, and described hereinbelow.

The sites include respective data services managers 310A, 310B and 310C that coordinate hypervisors in the sites, and coordinate hypervisors across the sites.

The system of FIG. 4 may be used for data replication, whereby data at one site is replicated at one or more other sites, for protection. The solid communication lines 330 in FIG. 4 are used for in-site traffic, the dashed communication lines 340 are used for replication traffic between sites, and the dotted communication lines 350 are used for control traffic between data services managers.

Data services managers 310A, 310B and 310C are control elements. The data services managers at each site communicate with one another to coordinate state and instructions. The data services managers track the hypervisors in the environment, and track health and status of the VDSAs 160A/1, 160A/2, . . . .

It will be appreciated by those skilled in the art that the environment shown in FIG. 4 may be re-configured by moving one or more virtual servers 110 from one hypervisor 100 to another, by moving one or more virtual disks 120 from one hypervisor 100 to another, and by adding one or more additional virtual servers 110 to a hypervisor 100.

In accordance with an embodiment of the present invention, the data services managers enable designating groups of specific virtual servers 110, referred to as virtual protection groups, to be protected. For virtual protection groups, write order fidelity is maintained. The data services managers enable designating a replication target for each virtual protection group; i.e., one or more sites, and one or more hypervisors in the one or more sites, at which the virtual protection group is replicated. A virtual protection group may have more than one replication target. The number of hypervisors and virtual servers within a virtual protection group and its replication target are not required to be the same.

Figure 5:
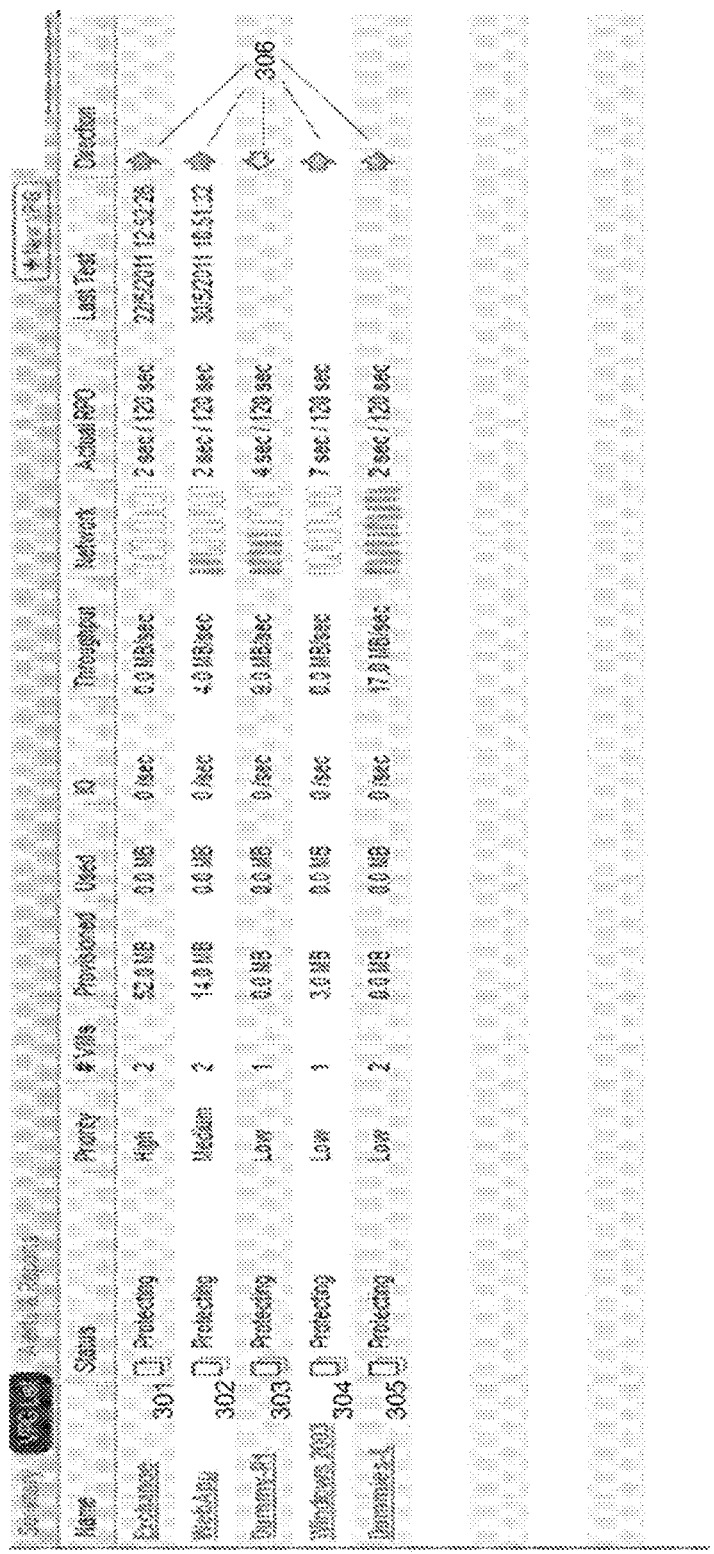
FIG. 5 is a user interface screenshot of bi-directional replication of virtual protection groups, in accordance with an embodiment of the present invention.

Reference is made to FIG. 5, which is a user interface screenshot of bi-directional replication of virtual protection groups, in accordance with an embodiment of the present invention. Shown in FIG. 4 are virtual protection groups 301 ("Exchange"), 302 ("WebApp"), 303 ("Dummy-R1"), 304 ("Windows 2003") and 305 ("Dummies-L"). Arrows 306 indicate direction of replication.

Figure 6:
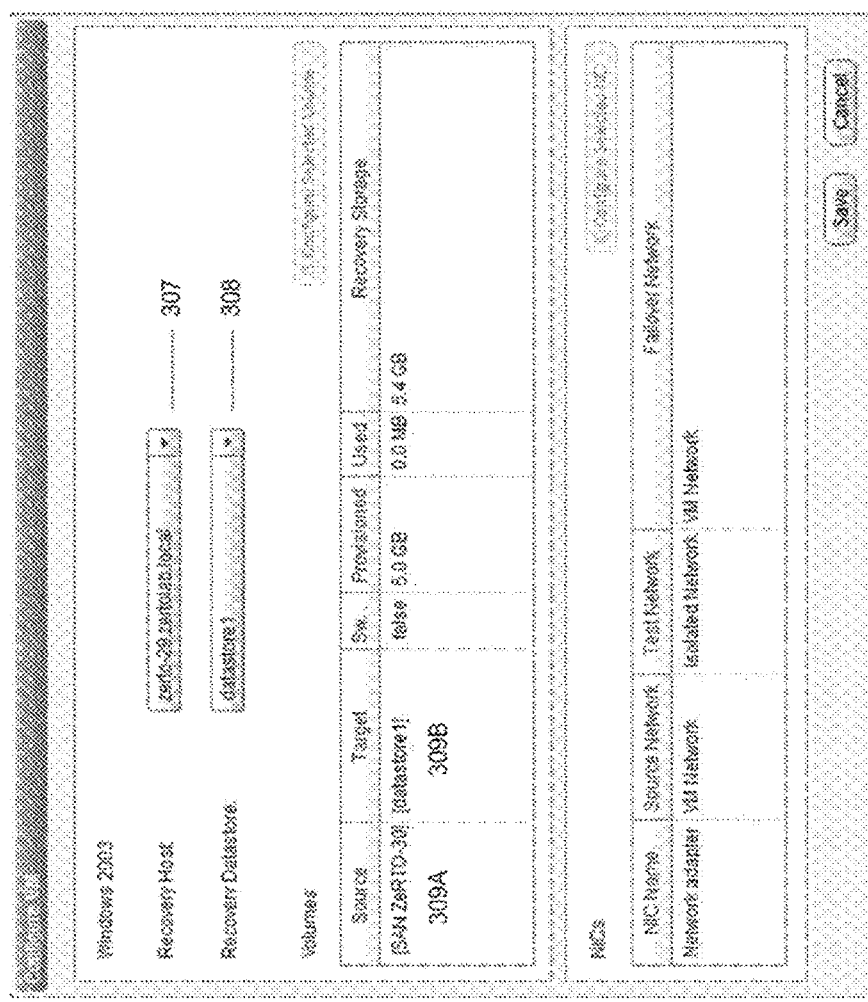
FIG. 6 is a user interface screenshot of assignment of a replication target for a virtual protection group, in accordance with an embodiment of the present invention.

Reference is made to FIG. 6, which is a user interface screenshot of assignment of a replication target for a virtual protection group, in accordance with an embodiment of the present invention. Shown in FIG. 6 is an entry 307 for designating a recovery host, and an entry 308 for designating a recovery datastore for virtual protection group 304 ("Windows 2003") of FIG. 5. Respective source and target datastores, [SAN ZeRTO-30] 309A and [datastore1] 309B, are shown as being paired.

More generally, the recovery host may be assigned to a cluster, instead of to a single hypervisor, and the recovery datastore may be assigned to a pool of resources, instead of to a single datastore. Such assignments are of particular advantage in providing the capability to recover data in an enterprise internal cloud that includes clusters and resource pools, instead of using dedicated resources for recovery.

The data services managers synchronize site topology information. As such, a target site's hypervisors and datastores may be configured from a source site.

Virtual protection groups enable protection of applications that run on multiple virtual servers and disks as a single unit. E.g., an application that runs on virtual servers many require a web server and a database, each of which run on a different virtual server than the virtual server that runs the application. These virtual servers may be bundled together using a virtual protection group.

Referring back to FIG. 4, data services managers 310A, 310B and 310C monitor changes in the environment, and automatically update virtual protection group settings accordingly. Such changes in the environment include inter alia moving a virtual server 110 from one hypervisor 100 to another, moving a virtual disk 120 from one hypervisor 100 to another, and adding a virtual server 110 to a hypervisor 100.

For each virtual server 110 and its target host, each VDSA 160A/1, 160A/2, . . . replicates IOs to its corresponding replication target. The VDSA can replicate all virtual servers to the same hypervisor, or to different hypervisors. Each VDSA maintains write order fidelity for the IOs passing through it, and the data services manager coordinates the writes among the VDSAs.

Since the replication target hypervisor for each virtual server 110 in a virtual protection group may be specified arbitrarily, all virtual servers 110 in the virtual protection group may be replicated at a single hypervisor, or at multiple hypervisors. Moreover, the virtual servers 110 in the source site may migrate across hosts during replication, and the data services manager tracks the migration and accounts for it seamlessly.

Reference is made to FIG. 7, which is an example an environment for system 300, in accordance with an embodiment of the present invention. As shown in FIG. 7, system 300 includes the following components.

Site A
Hypervisor 100A/1: virtual servers 110A/1-1, 110A/1-2, 110A/1-3.

Hypervisor 100A/2: virtual servers 110A/2-1, 110A/2-2, 110A/2-3.
Hypervisor 100A/3: virtual servers 110A/3-1, 110A/3-2, 110A/3-3.
Site B
Hypervisor 100B/1: virtual servers 110B/1-1, 110B/1-2, 110B/1-3.
Hypervisor 100B/2: virtual servers 110B/2-1, 110B/2-2, 110B/2-3.
Site C
Hypervisor 100C/1: virtual servers 110C/1-1, 110C/1-2, 110C/1-3, 110C/1-4.

As further shown in FIG. 7, system 300 includes the following virtual protection groups. Each virtual protection group is shown with a different hatching, for clarity.
VPG1 (shown with upward-sloping hatching)
  Source at Site A: virtual servers 110A/1-1, 110A/2-1, 110A/3-1
  Replication Target at Site B: virtual servers 110B/1-1, 110B/1-2, 110B/2-1
VPG2 (shown with downward-sloping hatching)
  Source at Site B: virtual servers 110B/1-3, 110B/2-2
  Replication Target at Site A: virtual servers 110A/1-2, 110A/2-2
VPG3 (shown with horizontal hatching)
  Source at Site A: virtual server 110A/3-3
  Replication Target at Site B: virtual serer 110B/2-3
  Replication Target at Site C: virtual server 110C/1-4
VPG4 (shown with vertical hatching)
  Source at Site A: virtual servers 110A/1-3, 110A/2-3, 110A/3-2
  Replication Target at Site C: virtual servers 110C/1-1, 110C/1-2, 110C/1-3

As such, it will be appreciated by those skilled in the art that the hypervisor architecture of FIG. 1 scales to multiple host sites, each of which hosts multiple hypervisors. The scaling flexibly allows for different numbers of hypervisors at different sites, and different numbers of virtual services and virtual disks within different hypervisors.

The present invention may be implemented through an application programming interface (API), exposed as web service operations. Reference is made to Appendices I-V, which define an API for virtual replication web services, in accordance with an embodiment of the present invention.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A hypervisor system, comprising:
  a tapping driver at a first host site to intercept a write request from a virtual server to a first virtual disk, the tapping driver installed in a software layer between the virtual server and the first virtual disk in a hypervisor kernel of a hypervisor; and
  a first virtual data services appliance at the first host site in communication the tapping driver to:
    receive the write request from the tapping driver,
    transmit a first copy of the write request to a journal manager at the first host site,
    transmit a second copy of the write request to a second virtual data services appliance at a second host site, the second copy assigned a sequence number, the second virtual data services appliance applies the write request to a second virtual disk at the second host site, and
    transmit a third copy of the write request to a data analyzer at the first host site.

2. The hypervisor system of claim 1, comprising:
  the first virtual data services appliance at the first host site to compress the second copy of the write request.

3. The hypervisor system of claim 1, comprising:
  the first virtual data services appliance at the first host site to cache the second copy of the write request and to transmit the second copy of the write request to the second virtual data services appliance, subsequent to a re-initialization of a network connection after a network outage between the first virtual data services appliance and the second virtual data services appliance.

4. The hypervisor system of claim 1, comprising:
  the first virtual data services appliance at the first host site to sequence the second copy of the write request based on the sequence number assigned to the second copy.

5. The hypervisor system of claim 1, comprising:
  the second virtual data service appliance at the second host site to order the write request on the second virtual disk based on the sequence number assigned to the second copy of the write request to maintain write order fidelity.

6. The hypervisor system of claim 1, comprising:
  a hash generator to derive a one-way hash for the journal manager based on the write request from the tapping driver.

7. The hypervisor system of claim 1, wherein the first virtual data services appliance is designated as part of a source virtual protection group and the second virtual data services appliance is designated as part of a target virtual protection group.

8. A system for providing data services for server virtualization, comprising:
  a hypervisor at a first host site, comprising:
    a first virtual server, the first virtual server paired with a second virtual server at a second host site;
    a first virtual disk read to and written by the first virtual server;
    a filter driver in communication with the first virtual server to intercept a write request from the first virtual server to the first virtual disk, the filter driver installed in a software layer between the first virtual server and the first virtual disk in a hypervisor kernel of the hypervisor; and
    a first virtual data services appliance in communication with the filter driver to:
      receive the write request from the filter driver,
      transmit a first copy of the write request to a journal manager,
      transmit a second copy of the write request to a second virtual data services appliance at the second host site, the second copy assigned a time stamp, the second virtual data services appliance applies the write request to a second virtual disk at the second host site, and
      transmit a third copy of the write request to a data analyzer.

9. The system of claim 8, comprising:
  the first virtual data services appliance to receive the write request from the filter driver, prior to storage of the write request at a physical disk associated with the hypervisor at the first host site.

10. The system of claim 8, comprising:
the first virtual data services appliance to transmit the second copy of the write request in accordance to a priority for network communications between the first virtual data services appliance and the second virtual data services appliance.

11. The system of claim 8, comprising:
the second virtual data service appliance at the second host site to order the write request on the second virtual disk based on the time stamp assigned to the second copy of the write request to maintain write order fidelity.

12. The system of claim 8, comprising:
the filter driver to transmit the write request to an I/O backend of the hypervisor for storage at a physical disk associated with the hypervisor at the first host site.

13. The system of claim 8, comprising:
a data services manager to designate the first host site as a first virtual protection group and the second host site as a second virtual protection group.

14. The system of claim 8, comprising:
a data services manager to coordinate a write order at the first virtual data services appliance and the second virtual data services appliance.

15. A method of providing data services for server virtualization, comprising:
intercepting, by a tapping driver at a first host site, a write request from a virtual server to a first virtual disk, the tapping driver installed in a hypervisor kernel of a hypervisor;
receiving, by a receiver at the first host site, the write request from the tapping driver;
generating, by a first virtual data services appliance at the first host site, a first copy of the write request, a second copy of the write request, and a third copy of the write request;
transmitting, by the first virtual data services appliance, to a journal manager, the first copy of the write request;
transmitting, by the first virtual data services appliance, to a second virtual data services appliance at a second host site, the second copy of the write request assigned a time stamp and triggering the second virtual data services appliance to apply the write request to a second virtual disk at the second host site; and
transmitting, by the first virtual data services appliance, to a data analyzer at the first host site, the third copy of the write request.

16. The method of claim 15, comprising:
compressing, by the first virtual data services appliance, the second copy of write request, prior to transmitting the second copy of the write request to the second virtual data services appliance.

17. The method of claim 15, comprising:
transmitting, by the first virtual data services appliance, to the second virtual data services appliance at the second host site, the second copy of the write request according to a priority for network communications between the first virtual data services appliance and the second virtual data services appliance.

18. The method of claim 15, comprising:
transmitting, by the first virtual data services appliance, to the data analyzer, the third copy of the write request, receipt of the third copy of the write request causing the data analyzer to determine at least one of an operating system level and a status of the virtual server.

19. The method of claim 15, comprising:
analyzing, by the first virtual data services appliance, data content of the write request from the tapping driver to identify a state of the virtual server.

20. The method of claim 15, comprising:
storing, by the journal manager, the first copy of the write request as a historical image on the first virtual disk at the first host site.

* * * * *